United States Patent
Morita et al.

(10) Patent No.: US 6,700,801 B2
(45) Date of Patent: Mar. 2, 2004

(54) SWITCHING POWER SUPPLY CAPABLE OF AC TO DC CONVERSION

(75) Inventors: Koichi Morita, Fujimi (JP); Toshiyuki Yamagishi, Kounosu (JP)

(73) Assignee: Sanken Electric Co., Ltd. (JP)

( * ) Notice: Subject to any disclaimer, the term of this patent is extended or adjusted under 35 U.S.C. 154(b) by 0 days.

(21) Appl. No.: 10/255,439

(22) Filed: Sep. 26, 2002

(65) Prior Publication Data

US 2003/0063480 A1 Apr. 3, 2003

(30) Foreign Application Priority Data

Sep. 28, 2001 (JP) .................................. 2001-303960

(51) Int. Cl.$^7$ ............................................... H02M 3/335
(52) U.S. Cl. ..................... 363/21.12; 363/47; 363/56.1; 323/284
(58) Field of Search ................................ 363/16, 21.01, 363/21.12, 21.15, 21.17, 21.18, 37, 39, 45, 47, 56.1; 323/282, 284, 285, 286, 287, 288

(56) References Cited

U.S. PATENT DOCUMENTS 6,466,463 B1 * 10/2002 Morita ..................... 363/21.16
6,574,122 B2 * 6/2003 Morita et al. ............ 363/21.01
6,639,813 B2 * 10/2003 Yamagishi et al. ....... 363/21.12

FOREIGN PATENT DOCUMENTS

JP 08154379 A 6/1996

* cited by examiner

Primary Examiner—Jessica Han
(74) Attorney, Agent, or Firm—Woodcock Washburn LLP

(57) ABSTRACT

A switching power supply capable of translating a.c. voltage of sinusoidal waveform into d.c. voltage, having a rectifier circuit connected to a pair of a.c. input terminals for rectifying the incoming commercial a.c. voltage. A first main switch is connected between the pair of outputs of the rectifier circuit via a main inductor. A smoothing capacitor is connected in parallel with the first main switch via a rectifying diode. A second main switch is connected in parallel with the smoothing capacitor via the primary winding of a transformer. The first and the second main switch are each provided with a soft-switching capacitor connected in parallel therewith. A first and a second ancillary inductor, electromagnetically coupled respectively to the main inductor and to the transformer primary, are connected in parallel with the first and the second soft-switching capacitor via a first and a second ancillary switch, respectively. A switch control circuit is connected to the main switches for on-off control thereof at a repetition frequency higher than the frequency of the input a.c. voltage, and to the ancillary switches for on-off control thereof at such a repetition frequency, and with such conducting periods, as to assure soft turn-on of the main switches.

15 Claims, 18 Drawing Sheets

SWITCHING POWER SUPPLY CAPABLE OF AC TO DC CONVERSION

BACKGROUND OF THE INVENTION

This invention relates to electric power supplies, and particularly to a switching power supply capable of a.c.-to-d.c. voltage conversion, featuring provisions for attainment of closer approximation of the input current waveform to a sinusoidal wave, and for that of a higher power factor, than by the comparable prior art.

The switching power supply or voltage regulator has long been familiar which comprises a rectifying and smoothing circuit to be coupled to a source of a.c. power, and a d.c.-to-d.c. converter circuit connected to the rectifying and smoothing circuit. The rectifying and smoothing circuit comprises a rectifier circuit and a smoothing capacitor. Although so simple in configuration, this known rectifying and smoothing circuit possesses the disadvantage of a somewhat poor power factor as a result of the fact that the smoothing capacitor is charged only at or adjacent the peaks of the a.c. voltage of sinusoidal waveform. Another drawback is that the input current is not favorable in waveform.

Designed to defeat these shortcomings, a more advanced switching power supply has also been suggested which comprises an inductor connected between the rectifier circuit and the smoothing capacitor, and a switch which is connected between the pair of outputs of the rectifier circuit and which is controllable via the inductor. The smoothing capacitor is connected in parallel with the switch via the rectifying diode. This known circuit comprising the inductor and the switch is sometimes referred to as the step-up power-factor improvement circuit. As the switch is turned on and off at a repetition frequency higher than the frequency of the input a.c. voltage, the current flowing through the inductor has a peak value in proportion with the instantaneous value of the input a.c. voltage. The results are a close approximation of the input current waveform to a sinusoidal waveform, and an improvement in power factor. It is also possible to make the voltage across the smoothing capacitor higher than the maximum value of the a.c. voltage.

It has also been known and practiced to connect a capacitor in parallel with the switch for on-off control of the rectifier output voltage, in order to protect this switch from overcurrent and to lessen its noise production. The capacitor will be charged when the switch is off, thereby preventing a rapid voltage buildup across the switch. However, when the switch is turned on, the energy that has been stored on the capacitor will be released through the switch, with consequent power loss.

An additional problem arises when a d.c.-to-d.c. converter circuit is coupled to the aforesaid step-up power-factor improvement circuit, the latter being then used as d.c. power supply. Including a switch for on-off control of the d.c. voltage, the d.c.-to-d.c. converter circuit provides another source of switching loss. A provision of separate circuits for on-off control of the switch in the power-factor improvement circuit and that in the d.c.-to-d.c. converter circuit, and for zero-voltage turning-on of both switches, would make the complete power supply system too complex in construction and expensive of manufacture.

It must also be taken into consideration that the on-off control of the power-factor improvement circuit switch and d.c.-to-d.c. converter circuit switch at the same repetition frequency is undesirable. Noise might then be produced, or the switches might become unstable in operation, as a result of the frequency interference of both switches.

Japanese Unexamined Patent Publication No. 8-154379 suggests a different type of switching power supply. The switch in the d.c.-to-d.c. converter circuit is utilized for switching both the d.c. voltage across the smoothing capacitor and the current through the inductor for power factor improvement. One switch performs the dual purpose of power factor improvement and d.c.-to-d.c. conversion, but to lesser extents than by two switches.

SUMMARY OF THE INVENTION

The present invention has it among its objects, in a step-up power supply of the type defined, to reduce power loss and noise production due to switching by simpler means than heretofore and without the difficulties so far experienced.

Another object of the invention is to further improve the power factor of the power supply and, at the same time, to most effectively and inexpensively lessen power losses due to the switch included in the power-factor improvement circuit and that in the d.c.-to-d.c. converter.

Briefly, the present invention may be summarized as a switching power supply capable of translating a.c. voltage of sinusoidal waveform into d.c. voltage. Included is a rectifier circuit connected to a pair of input terminals for rectifying the input a.c. voltage, the rectifier circuit having a first and a second output for providing a rectifier output voltage. A main switch is connected to the first output of the rectifier circuit via a main inductor on one hand and, on the other hand, to the second output of the rectifier circuit. The main switch has capacitance means for its soft switching, the capacitance means being in the form of either a discrete capacitor connected in parallel therewith or its parasitic capacitance. A rectifying diode is connected to the rectifier circuit via the main inductor. A smoothing capacitor is connected in parallel with the main switch via the rectifying diode. An ancillary inductor is connected to an input terminal or an output terminal of the main inductor and electromagnetically coupled thereto. An ancillary switch is connected to the input terminal or the output terminal of the main inductor via the ancillary inductor on one hand and, on the other hand, to the second output of the rectifier circuit. A first reverse-blocking diode is connected in series with the ancillary inductor. Also included is a switch control circuit which is connected to the primary switch for on-off control thereof at a repetition frequency higher than the frequency of the input a.c. voltage, and to the ancillary switch for on-off control thereof at such a repetition frequency, and with such conducting periods, as to assure soft turn-on of the main switch.

The invention as summarized above features the ancillary inductor electromagnetically coupled to the main inductor, and the ancillary switch connected in series with the ancillary inductor. Voltage will be impressed to the ancillary inductor when the ancillary switch is turned on earlier than the main switch. This ancillary inductor voltage will act to cause a rapid decrease in the magnitude of the current charging the smoothing capacitor due to the energy stored on the main inductor. When the rectifying diode, connected to the smoothing capacitor for charging the same, becomes nonconductive, the soft-switching capacitor connected in parallel with the main switch will release the energy that has been stored thereon. The main switch may be turned on after the current charging the smoothing capacitor has dropped to zero and the soft-switching capacitor has completed its energy release. The main switch will then be turned on at zero or very low voltage, and at zero or very low current. Thus is accomplished the so-called soft switching of the main switch.

The soft-switching capacitor and the ancillary inductor constitute in combination a resonant circuit conducive to the soft switching of the main switch. As a result, less power loss and less noise occur at the main switch, and the power factor is improved with the power loss kept at a minimum.

Preferably, the switching power supply according to the invention additionally comprises a transformer, a rectifying and smoothing circuit connected to the transformer for providing output d.c. voltage, a second main switch connected to the smoothing capacitor via the transformer, second soft-switching capacitance means such as a capacitor connected in parallel with the second main switch, a second ancillary inductor electromagnetically coupled to a primary winding of the transformer and having one extremity connected to a junction between the second main switch and the smoothing capacitor, and a second ancillary switch connected to another extremity of the second ancillary inductor. Besides being connected to the first recited main switch for its on-off control, the switch control circuit is connected to the second main switch for on-off control thereof in order to cause d.c. voltage to be intermittently applied from the smoothing capacitor to the primary winding of the transformer, and to the first and the second ancillary switch for on-off control thereof at such a repetition frequency, and with such conducting periods, as to assure soft turn-on of both first and second main switches.

The second soft-switching capacitance means and the second ancillary inductor constitute in combination a second resonant circuit conducive to the soft switching of the second main switch. This second main switch is therefore also kept from power loss and noise production, and d.c.-to-d.c. conversion is accomplished with minimal power loss.

The first ancillary switch is designed for control of the first resonant circuit comprised of the first soft-switching capacitance means and the first ancillary inductor, and the second ancillary switch for control of the second resonant circuit comprised of the second soft-switching capacitance means and the second ancillary inductor. Both first and second ancillary switches are drivable by the same signal from the same switch control circuit as for both main switches.

The electromagnetic coupling of the first ancillary inductor with the main inductor is effective to restrict the current flowing through the main inductor into the smoothing capacitor when the first ancillary switch is turned on with consequent voltage application to the first ancillary inductor. The current thus flowing into the smoothing capacitor drops to zero in a relatively short period of time, resulting in early commencement of discharge by the first soft-switching capacitance means.

Similarly, as a result of the electromagnetic coupling of the second ancillary inductor with the transformer primary, the energy release from transformer primary to rectifying and smoothing circuit is completed in a relatively short period of time when the second ancillary switch is turned on with consequent voltage application to the second ancillary inductor. The result is an early commencement of discharge by the second soft-switching capacitance means.

Electromagnetically coupled together, moreover, the main inductor and the first ancillary inductor are manufacturable as a compact, integral combinations. The same applies to the transformer primary and the second ancillary inductor which are electromagnetically coupled together. The transformer is manufacturable in compact, integral combination with the second ancillary inductor.

It is also an advantage of this invention that the two main switches are both driven at the same switching frequency. The switch control circuit is much simpler and inexpensive in construction than if the main switches are driven at different frequencies. The driving of the main switches at different frequencies is objectionable for an additional reason: The different driving frequencies would be difficult of creation because of their possible mutual interference. Noise production would also be easier to occur.

In some embodiments of the invention, not only are the two main switches driven at the same frequency, but they are turned on simultaneously. The switch control circuit can then be made further simpler in construction.

In some other embodiments, however, the two main switches are turned on at different moments. One such embodiment employs what are termed conducting period limitation signals for variously delaying the beginnings of predefined tentative conducting periods of the main switches. The conducting period limitation signals permit the main switches to be turned on at different moments that are independently adjustable.

A yet further embodiment is disclosed in which the main switches are turned on when the voltages across them drop below predetermined reference voltages. The main switches can then be turned on at zero or very low voltages more positively than in cases where they are turned on at moments by timers.

The above and other objects, features and advantages of this invention will become more apparent, and the invention itself will best be understood, from a study of the following detailed description and appended claims, with reference had to the attached drawings showing the preferred embodiments of the invention.

DESCRIPTION OF THE PREFERRED EMBODIMENTS

Figure 1:
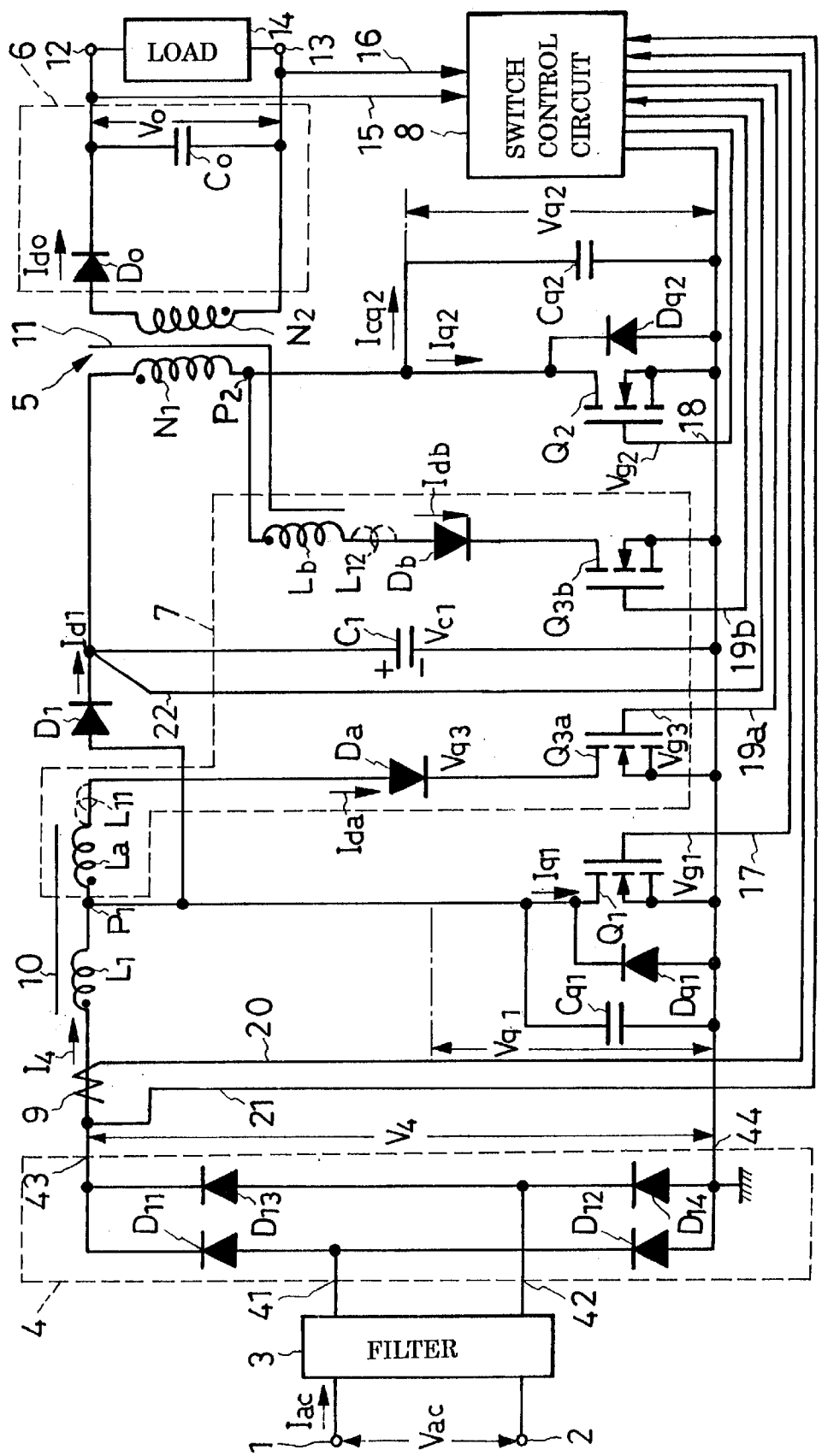
FIG. 1 is a schematic electrical diagram of a first preferred form of switching power supply according to the invention.

The switching power supply shown in FIG. 1 by way of a preferable embodiment of the invention has a pair of input terminals 1 and 2 which are to be connected to a source, not shown, of commercial a.c. voltage $V_{ac}$ with a frequency of, for instance, 50 Hz. A noise filter 3 is connected to this pair of input terminals 1 and 2. The noise filter 3 can be of the conventional make comprising inductors and capacitors for removal of high-frequency noise from the incoming fixed-frequency alternating current.

The noise filter 3 is connected to a rectifier circuit 4 having a first 41 and a second 42 input, four diodes $D_{11}$, $D_{12}$, $D_{13}$ and $D_{14}$ in bridge connection, and a first 43 and a second 44 output. The pair of rectifier inputs 41 and 42 are connected to the pair of a.c. inputs 1 and 2, respectively, via the noise filter 3. The rectifier circuit 4 makes full-wave rectification of the incoming a.c. voltage $V_{ac}$ and produces an output voltage $V_4$ between the pair of outputs 43 and 44.

The output 43 of the rectifier circuit 4 is connected to a first extremity of a main inductance coil or a main inductor $L_1$ which is wound on a magnetic core 10. The main inductor $L_1$ is intended for both power factor improvement and for voltage step-up. The second extremity of the main inductor $L_1$ is connected to an ancillary inductance coil or an ancillary inductor $L_a$ which is shown included in an ancillary soft-switching circuit 7. The ancillary inductor $L_a$ is wound on the same magnetic core 10 as is the main inductor $L_1$. It is understood that both main inductor $L_1$ and ancillary inductor $L_a$ have leakage inductance.

A first main switch $Q_1$ is connected between the second extremity of the main inductor $L_1$ and the second output 44 of the rectifier circuit 4. Shown as an insulated-gate field-effect transistor, the first main switch $Q_1$ is intended for intermittent voltage application to the main inductor $L_1$. Connected reversely in parallel with the first main switch $Q_1$ is a diode $D_{q1}$ which will be hereinafter referred to as the first parallel diode. In practice, however, a diode built into the first main switch $Q_1$, or the so-called "body diode" thereof, could serve the purposes of the first parallel diode $D_{q1}$.

A first soft-switching capacitor $C_{q1}$ is also shown connected in parallel with the first main switch $Q_1$. The provision of this discrete soft-switching capacitor is not an absolute requirement, either; in practice, its purposes may be served by the parasitic capacitance between the drain and source of the first main switch $Q_1$.

A smoothing capacitor $C_1$, preferably an electrolytic capacitor, is connected in parallel with the first main switch $Q_1$, via a rectifying diode $D_1$. The rectifying diode $D_1$ is nonconductive during each conducting period of the first main switch $Q_1$, and conductive during part or whole of each nonconducting period of the first main switch. The smoothing capacitor $C_1$ functions as d.c. power supply for the d.c.-to-d.c. converter circuit yet to be described. The rectifier circuit 4, the main inductor $L_1$, the first main switch $Q_1$, the rectifier diode $D_1$, and the smoothing capacitor $C_1$ constitute in combination the switching power supply or step-up power-factor improvement circuit.

At 5 is shown a transformer having a primary winding $N_1$, a secondary winding $N_2$, and a tertiary winding or a second ancillary inductor $L_b$, all wound around a magnetic core 9 and electromagnetically coupled together. The three transformer windings $N_1$, $N_2$ and $L_b$ are polarized as marked with the dots in FIG. 1. It will be seen from the markings that the transformer primary $N_1$ and secondary $N_2$ are opposite in polarity. The transformer primary $N_1$ has one of its opposite extremities connected directly to one of the opposite polarity terminals of the smoothing capacitor $C_1$, and the other extremity connected to the other terminal of the smoothing capacitor $C_1$ via a second main switch $Q_2$; in other words, the smoothing capacitor $C_1$ is in parallel with the serial connection of transformer primary $N_1$ and second main switch $Q_2$.

Like the first main switch $Q_1$, the second main switch $Q_2$ is shown as an insulated-gate field-effect transistor, having a drain connected to the transformer primary $N_1$, and a source connected to the smoothing capacitor $C_1$. This second main switch $Q_2$ also has a second parallel diode $D_{q2}$ connected reversely in parallel therewith. This second parallel diode $D_{q2}$ could also be replaced by an inbuilt diode, or body diode, of the second main switch $Q_2$.

The second main switch $Q_2$ has its own soft-switching capacitor $C_{q2}$ (hereinafter referred to as the second soft-switching capacitor in contradistinction from the first recited soft-switching capacitor $C_{q1}$) connected in parallel therewith. The second soft-switching capacitor $C_{q2}$ would also be unnecessary if the second main switch $Q_2$ had a sufficient amount of parasitic capacitance between its drain and source. Also, like the first soft-switching capacitor $C_{q1}$, the second soft-switching capacitor $C_{q2}$ is less in capacitance than the smoothing capacitor $C_1$.

The transformer secondary $N_2$ has its opposite extremities connected respectively to the pair of output terminals 12 and 13 via a rectifying and smoothing circuit 6. The rectifying and smoothing circuit 6 comprises a rectifying diode $D_0$ and a smoothing capacitor $C_0$. The capacitor $C_0$ is connected in parallel with the transformer secondary $N_2$ via the diode $D_0$. Connected between one extremity of the transformer secondary $N_2$ and the output terminal 12, the diode $D_0$ is so oriented as to be conductive when the second main switch $Q_2$ is off, and nonconductive when the second main switch $Q_2$ is on. A unidirectional output voltage is thus obtained between the pair of output terminals 12 and 13 for feeding a load 14 connected thereto.

The present invention particularly features the noted ancillary soft-switching circuit 7 which comprises two ancillary switches $Q_{3a}$ and $Q_{3b}$, the noted first ancillary inductance coil or first ancillary inductor $L_a$, two reverse-blocking diodes $D_a$ and $D_b$, and the noted second ancillary inductance coil or second ancillary inductor $L_b$. Wound on the same magnetic core 10 as is the main inductor $L_1$, the first ancillary inductor $L_a$ has one extremity thereof connected to the output-side extremity of the main inductor, and the other extremity connected to the first ancillary switch $Q_{3a}$ via the first reverse-blocking diode $D_a$. The first ancillary switch $Q_{3a}$ is connected between the first reverse-blocking diode $D_a$ and the second output 44 of the rectifier circuit 4. As indicated by the dashed line in FIG. 1, an additional inductor $L_{11}$ may be connected in series with the first ancillary inductor $L_a$ in cases where the first ancillary inductor fails to provide sufficient inductance for the desired soft switching of the first main switch $Q_1$.

Wound around the transformer core 11 as its tertiary winding so as to possess leakage inductance, the second ancillary inductor $L_b$ has one extremity thereof connected to the junction $P_2$ between transformer primary $N_1$ and the drain of the second main switch $Q_2$. The other extremity of the second ancillary inductor $L_b$ is connected to the second ancillary switch $Q_{3b}$ via the second reverse-blocking diode $D_b$. The second ancillary switch $Q_{3b}$ is connected between the second reverse-blocking diode $D_b$ and the second output 44 of the rectifier circuit 4. Here again, as indicated by the dashed line in FIG. 1, another additional inductor $L_{12}$ may be connected in series with the second ancillary inductor $L_b$ in cases where this second ancillary inductor fails to provide sufficient inductance for the soft switching of the second main switch $Q_2$. The two ancillary switches $Q_{3a}$ and $Q_{3b}$ are both shown as insulated-gate field-effect transistors.

As shown also in FIG. 1, a switch control circuit 8 has inputs connected to the pair of d.c. output terminals 12 and 13 by way of conductors 15 and 16 for inputting the d.c. output voltage $V_0$. The switch control circuit 8 has outputs connected to the gates of the two main switches $Q_1$ and $Q_2$ by way of conductors 17 and 18, and to the gates of the two ancillary switches $Q_{3a}$ and $Q_{3b}$ by way of conductors $19_a$ and $19_b$. The switch control circuit 8 is connected to the sources of all these switches $Q_1$, $Q_2$, $Q_{3a}$ and $Q_{3b}$ as well. Moreover, for power factor improvement, the switch control circuit 8 is connected to the noted current detector 9 by way of a conductor 20, and to the first output 43 of the rectifier circuit 4 by way of a conductor 21. One of the opposite polarity terminals of the smoothing capacitor $C_1$ is also connected to the switch control circuit 8 by way of a conductor 22 for holding constant the voltage $V_{c1}$ across the smoothing capacitor. The switch control circuit 8 delivers a first main switch control signal $V_{g1}$ over the conductor 17 for on-off control of the first main switch $Q_1$, a second main switch control signal $V_{g2}$ over the conductor 18 for on-off control of the second main switch $Q_2$, and an ancillary switch control signal $V_{g3}$ over the conductors $19_a$ and $19_b$ for on-off control of the ancillary switches $Q_{3a}$ and $Q_{3b}$.

Figure 2:
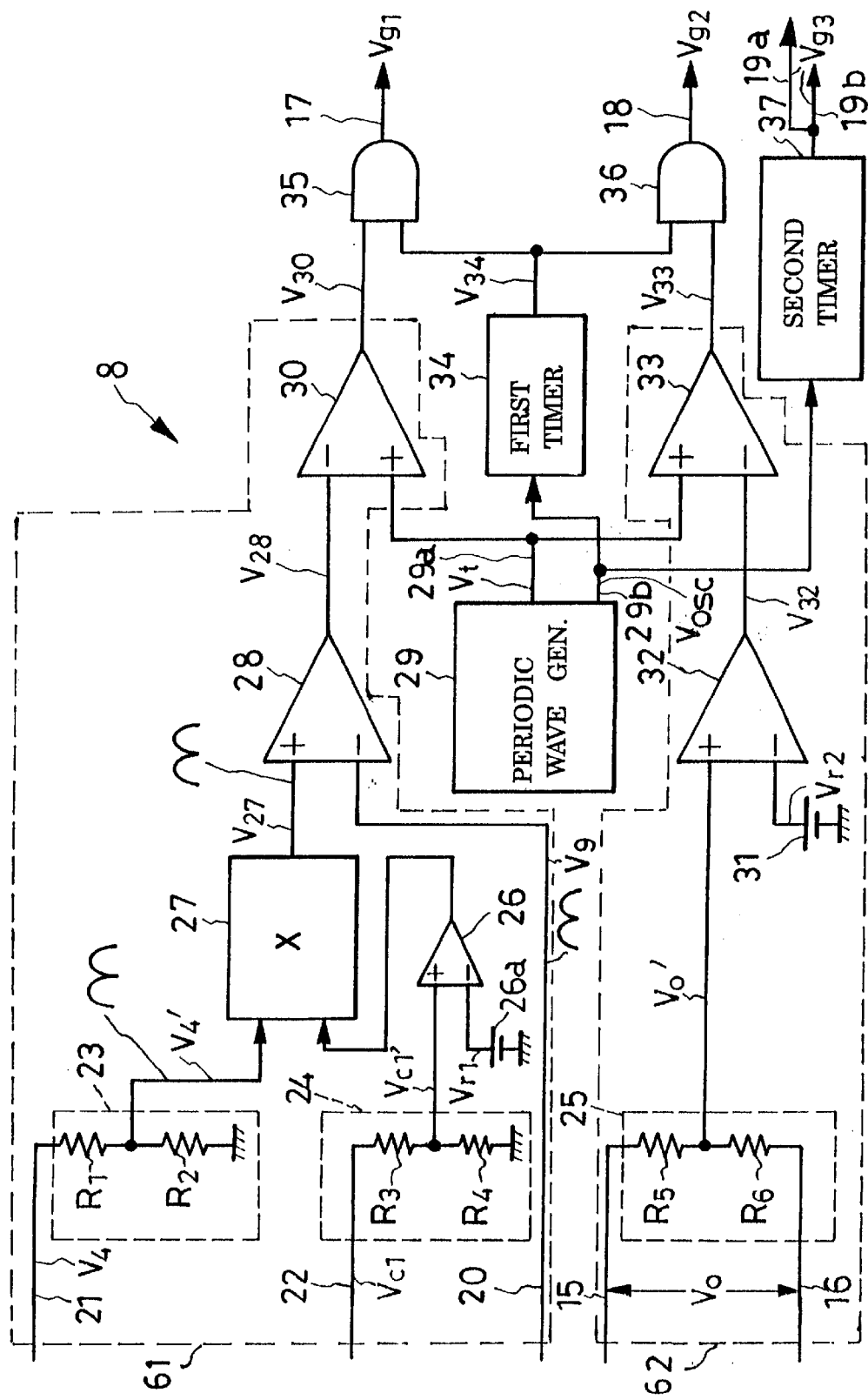
FIG. 2 is a schematic electrical diagram, partly in block form, showing in more detail the switch control circuit included in the FIG. 1 embodiment.

As illustrated in detail in FIG. 2, the switch control circuit 8 broadly comprises a first main switch control circuit 61 for determination of the conducting periods of the first main switch $Q_1$, a second main switch control circuit 62 for determination of the conducting periods of the second main switch $Q_2$, a periodic wave generator 29, two timers 34 and 37, and two AND gates 35 and 36. The first main switch control circuit 61 controls the conducting periods of the first main switch $Q_1$ so as to hold the voltage across the smoothing capacitor $C_1$ at a desired value and to cause the input current of the rectifier circuit 4 to approximate a sinusoidal wave in waveform. The second main switch control circuit 62 controls the conducting periods of the second main switch $Q_2$ so as to hold the output voltage of the rectifying and smoothing circuit 6 at a desired value. The periodic wave generator 29 might be considered a part of both first and second main switch control circuits 61 and 62.

The first main switch control circuit 61 includes a rectifier terminal voltage detector circuit or a rectifier output voltage detector circuit 23 connected by way the conductor 21 to the first output 43, FIG. 1, of the rectifier circuit 4. The rectifier output voltage detector circuit 23 takes the form of a serial connection of two resistors $R_1$ and $R_2$ for dividing the rectifier output voltage $V_4$, the latter being the result of full-wave rectification of the incoming a.c. voltage of sinusoidal waveform. The output from the rectifier output voltage detector circuit 23 is designated $V_4'$.

Also included in the first main switch control circuit 61 is a capacitor voltage detector circuit 24 which is connected to the smoothing capacitor $C_1$, FIG. 1, by way of the conductor 22. Dividing the capacitor voltage $V_{c1}$ by a serial connection of two resistors $R_3$ and $R_4$, the capacitor voltage detector circuit 24 puts out a voltage $V_{c1}'$ for delivery to a subtracter 26. This subtracter puts out a difference between the capacitor voltage detector output voltage $V_{c1}'$ and a reference voltage $V_{r1}$ from its source $26_a$. The subtracter output is directed into a multiplier 27.

The multiplier 27 has another input connected to the rectifier output voltage detector circuit 23. The output $V_{27}$ from the multiplier 27 is therefore the product of the output $V_4'$ from the rectifier output voltage detector circuit 23 and the output from the subtracter 26. The multiplier output $V_{27}$ has a waveform like that resulting from a full-wave rectification of a sinusoidal wave. The multiplier output voltage $V_{27}$ has its amplitude so adjusted as to keep constant the smoothing capacitor voltage $V_{c1}$ by the output from the subtracter 26.

A second subtracter 28 has one input connected to the multiplier 27, and another input connected to the current detector 9, FIG. 1, by way of the conductor 20. The current detector 9 is coupled to the output line of the rectifier circuit 4, and provides a voltage $V_9$ in proportion with the magnitude of the current $I_4$ issuing from the first output 43 of the rectifier circuit 4. The output from the second subtracter 28 is therefore the difference $V_{28}$ between the multiplier output voltage $V_{27}$ and the current detector output voltage $V_9$. This second subtracter output $V_{28}$ is directed into a comparator 30, the final-stage component of the first main switch control circuit 61.

The periodic wave generator 29 is a generic name encompassing generators of any suitable types of periodic voltage waveforms. It takes the form of a sawtooth generator in this particular embodiment, putting out on its output $29_a$ a sawtooth voltage $V_t$ with a frequency of, say, 20 kHz, which is much higher than the a.c. input voltage to be applied between the pair of input terminals 1 and 2. This sawtooth voltage frequency determines the switching frequency of the two main switches $Q_1$ and $Q_2$ and two ancillary switches $Q_{3a}$ and $Q_{3b}$. It is understood that the sawtooth generator 29 has a clock, not shown, built into it for synchronization of the sawtooth voltage. This clock is utilized for the additional purposes of triggering the timers 34 and 37 in this embodiment, so that the sawtooth generator 29 is furnished with another output $29_b$ for delivering the clock pulses $V_{osc}$ to the timers.

Although but one sawtooth generator 29 is shown provided to help produce the three control signals $V_{g1}$, $V_{g2}$ and $V_{g3}$ for the two main switches $Q_1$ and $Q_2$ and two ancillary switches $Q_{3a}$ and $Q_{3b}$, two or three sawtooth or other periodic wave generators could be employed for the same purposes. As an additional possible modification of the illustrated embodiment, the timers 34 and 37 could be triggered by pulses fabricated from the sawtooth voltage $V_t$, instead of by the clock pulses $V_{osc}$.

The output $29_a$ of the sawtooth generator 29 is connected to one input of the comparator 30 of the first main switch control circuit 61 for delivery of the sawtooth voltage $V_t$ thereto. The other input of the comparator 30 is connected as aforesaid to the second subtracter 28 for inputting its output voltage $V_{28}$.

Figure 3:
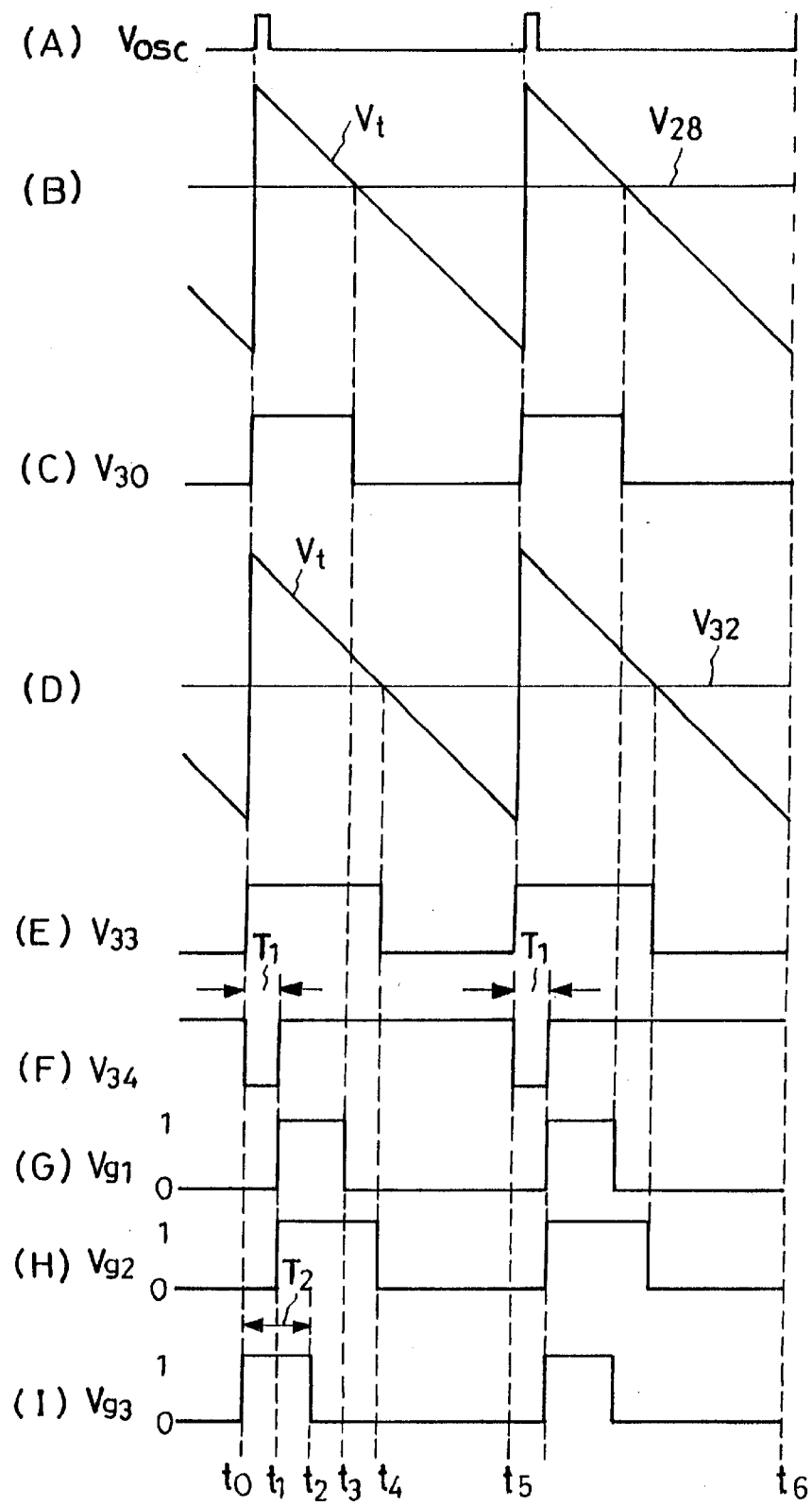
FIG. 3, consisting of (A) through (I), is a series of diagrams showing the voltage and current waveforms appearing at various parts of the FIG. 2 switch control circuit.

At (A) in FIG. 3 is shown the series of clock pulses $V_{osc}$ which is generated by the unshown clock built into the sawtooth generator 29 and with which the sawtooth voltage $V_t$ is synchronized. The same figure indicates at (B) both the sawtooth voltage $V_t$ and the second subtracter output voltage $V_{28}$. Comparing these two inputs, the comparator 30 will produce the rectangular wave output $V_{30}$ seen at (C) in FIG. 3. This comparator output $V_{30}$ tentatively predefines the conducting periods of the first main switch $Q_1$. The actual conducting periods of the first main switch $Q_1$ are yet to be redefined in a manner that will become apparent as the description progresses.

The second main switch control circuit 62 includes an output voltage detector circuit 25 having two voltage-dividing resistors $R_5$ and $R_6$ interconnected in series between the pair of input conductors 15 and 16 and hence between the pair of outputs 12 and 13, FIG. 1, of this power supply. Thus the output voltage detector circuit 25 provides a voltage $V_0'$ in proportion with the power supply output voltage $V_0$. The output voltage detector circuit 25 is connected to one input of a subtracter 32, the other input of which is connected to a source 31 of reference voltage $V_{r2}$. The resulting output from the subtracter 32 is the difference $V_{32}$ between the output voltage detector output $V_0'$ and the reference voltage $V_{r2}$.

A comparator 33, the final-stage component of the second main switch control circuit 62, has one input connected to the output $29_a$ of the sawtooth generator 29, and another input connected to the subtracter 32. As indicated at (D) in FIG. 3, the comparator 33 will compare the sawtooth voltage $V_t$ and the subtracter output voltage $V_{32}$ and produce the rectangular wave output $V_{33}$ seen at (E) in FIG. 3. This comparator output $V_{33}$ tentatively predefines the conducting periods of the second main switch $Q_2$, FIG. 1. The actual conducting periods of the second main switch $Q_2$ are yet to be redefined.

The actual conducting periods of the two main switches $Q_1$ and $Q_2$ are under limitations to be imposed by the first timer 34, which has its input connected to the second output $29_b$ of the sawtooth generator 29. Triggered by each clock pulse $V_{osc}$, FIG. 3(A), or by each rise of the sawtooth wave, FIG. 3(B), as at $t_0$, the first timer 34 will put out a "negative" pulse of first predetermined duration $T_1$, FIG. 3(F), as from $t_0$ to $t_1$.

The comparator 30 of the first main switch control circuit 61 and the first timer 34 are both connected to the AND gate 35 as a first logic circuit. The output from the AND gate 35 is the first main switch control signal $V_{g1}$, FIG. 3(G), which represents the logical product of the comparator output voltage $V_{30}$, FIG. 3(C), and the first timer output voltage $V_{34}$, FIG. 3(F). The first main switch control signal $V_{g1}$ will be delivered over the conductor 17 to the first main switch $Q_1$, FIG. 1, causing conduction therethrough as from $t_1$ to $t_3$ in FIG. 3.

The other AND gate 36 as a second logic circuit has its inputs connected to the first timer 34 and to the comparator 33 of the second main switch control circuit 62. The output from this AND gate 36 is the second main switch control signal $V_{g2}$, FIG. 3(H), which represents the logical product of the comparator output voltage $V_{33}$, FIG. 3(E), and the first timer output voltage $V_{34}$, FIG. 3(F). The second main switch control signal $V_{g2}$ will be delivered over the conductor 18 to the second main switch $Q_2$, FIG. 1, causing conduction therethrough as from $t_1$ to $t_4$ in FIG. 3.

Connected to the clock pulse output $29_b$ of the sawtooth generator 29, the second timer 37 puts out the ancillary switch control signal $V_{g3}$, FIG. 3(I), for delivery to the two ancillary switches $Q_{3a}$ and $Q_{3b}$ over the conductors $19_a$ and $19_b$. The ancillary switch control signal $V_{g3}$ includes pulses of second predetermined duration $T_2$, lasting as from $t_0$ to $t_2$ in FIG. 3, which rise in synchronism with the rises of the sawtooth voltage $V_t$. The duration $T_2$ of the ancillary switch control pulses $V_{g3}$ is longer than the duration $T_1$ of each "negative" output pulse $V_{34}$ of the first timer 34.

As is clear from a comparison of the three switch control signals $V_{g1}$, $V_{g2}$ and $V_{g3}$ at (G), (H) and (I) in FIG. 3, the two ancillary switches $Q_{3a}$ and $Q_{3b}$ are both turned on at $t_0$, which is earlier by $T_1$ than $t_1$ when the two main switches $Q_1$ and $Q_2$ are both turned on. Thus is accomplished the soft turn-on of the main switches $Q_1$ and $Q_2$. The period $T_1$ should last from $t_0$, when both ancillary switches $Q_{3a}$ and $Q_{3b}$ are both turned on, to the moment when the main switch voltages $V_{q1}$ and $V_{q2}$ becomes substantially zero or less than the voltage during the nonconducting periods of the main switches $Q_1$ and $Q_2$. The moment $t_2$ when the ancillary switch control signal $V_{g3}$ goes low, causing nonconduction through the two ancillary switches $Q_{3a}$ and $Q_{3b}$, should be not later than $t_3$ when either of the two main switches $Q_1$ and $Q_2$ terminates conduction earlier than the other.

Figure 4:
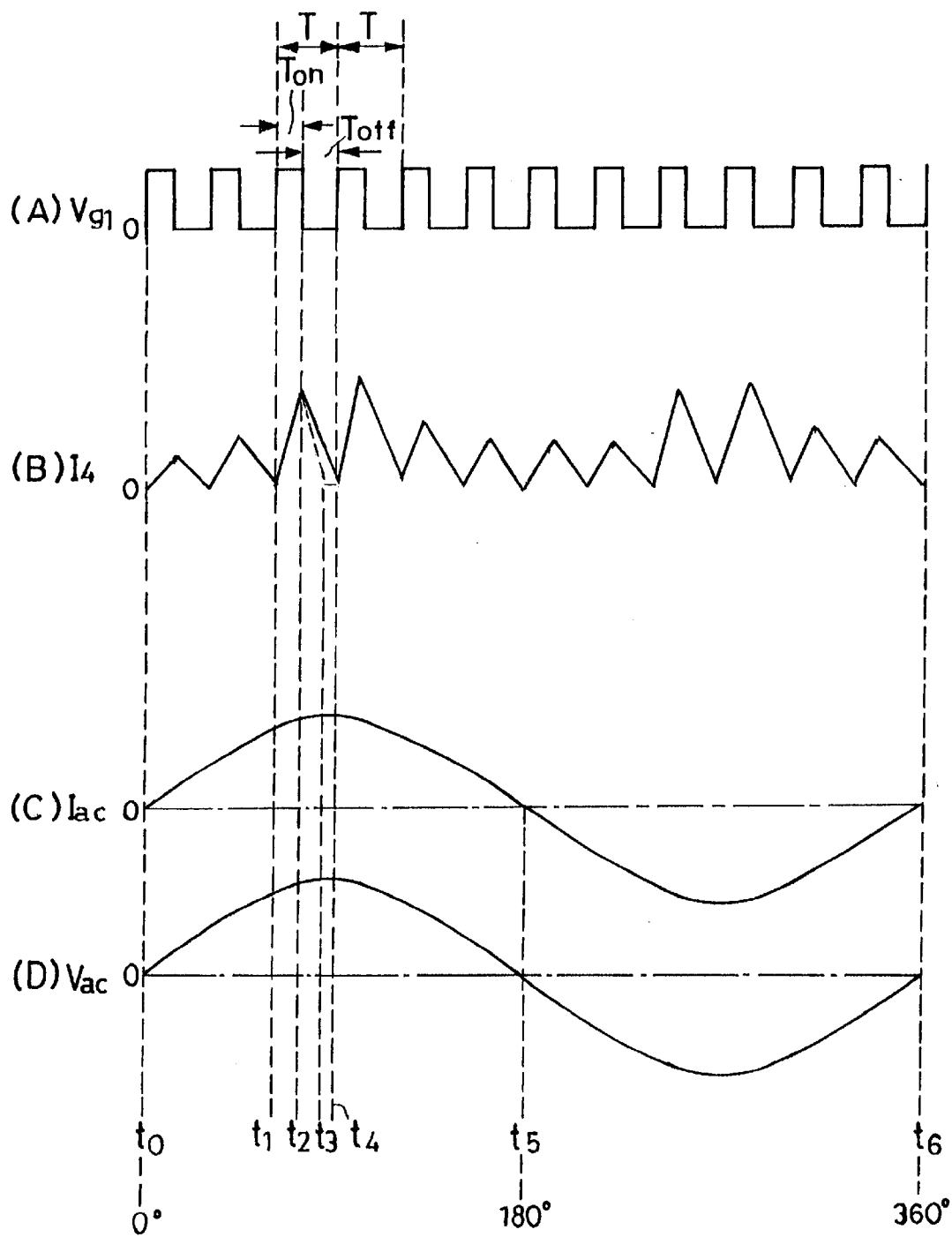
FIG. 4, consisting of (A) through (D), is a series of diagrams showing the voltage and current waveforms appearing at various parts of the FIG. 1 circuitry in order to explain how improvements in power factor and input waveform are achieved.

For an easier understanding of the basic operation of the FIG. 1 power supply, such operation will now be explained on the assumption that the ancillary soft-switching circuit 7 were nonfunctional. FIG. 4 shows the voltage and current waveforms that would appear at various parts of FIG. 1 should the two ancillary switches $Q_{3a}$ and $Q_{3b}$ of the ancillary soft-switching circuit 7 be held off.

The rectifier output voltage $V_4$, the result of full-wave rectification of the incoming a.c. voltage $V_{ac}$, FIG. 4(D), will be intermittently applied to the main inductor $L_1$ if the first main switch $Q_1$ is turned on and off by the first main switch control signal $V_{g1}$, FIG. 4(A). During each conducting period $T_{on}$ of the first main switch $Q_1$, as from $t_1$ to $t_2$ in FIG. 4, the rectifier output current $I_4$ will flow along the path comprising the first output 43 of the rectifier circuit 4, the main inductor $L_1$, the first main switch $Q_1$, and the second output 44 of the rectifier circuit 4. As indicated at (B) in FIG. 4, the current $I_4$ will increase in magnitude with time owing to the inductance of the main inductor $L_1$ during each conducting period $T_{on}$ of the first main switch $Q_1$. Energy will be stored on the inductor during each such period.

At $t_2$ in FIG. 4, when the first main switch $Q_1$ goes off, the inductor $L_1$ will start releasing the stored energy, causing conduction through the diode $D_1$ as the sum of the rectifier output voltage $V_4$ and the voltage across the main inductor $L_1$ grows higher than the voltage $V_{c1}$ across the smoothing capacitor $C_1$. Current will then flow along the path comprising the first rectifier output 43, main inductor $L_1$, diode $D_1$, smoothing capacitor $C_1$, and second rectifier output 44, thereby charging the smoothing capacitor. The rectifier output current $I_4$ will decrease in magnitude during each nonconducting period $T_{off}$ of the first main switch $Q_1$. Although the rectifier output current $I_4$ is shown in FIG. 4 as flowing until $t_4$ when the next conducting period $T_{on}$ starts, the inductance value of the inductor $L_1$ may be so determined that the current $I_4$ may drop to zero as at $t_3$ which precedes $t_4$, as indicated by the dashed line in FIG. 4.

The rectifier output current $I_4$ during the conducting periods $T_{on}$ of the first main switch $Q_1$ change in peak value in proportion with the instantaneous value of the rectifier output voltage $V_4$. Consequently, as will be noted from (C) and (D) in FIG. 4, the a.c. input $I_{ac}$ will approximate the input a.c. voltage $V_{ac}$ in phase and become sinusoidal, or approximately so. Improvement in power factor will then be accomplished by turning the first main switch $Q_1$ on and off at a repetition frequency higher than that of the input a.c. voltage. Moreover, thanks to voltage boosting by the main inductor $L_1$, the smoothing capacitor $C_1$ will be charged to a voltage higher than the rectifier output voltage $V_4$.

The conducting periods of the first main switch $Q_1$ will become shorter if the voltage $V_{c1}$ across the smoothing capacitor $C_1$ becomes higher than normal. The voltage $V_{c1}$ will return to normal as correspondingly less energy is stored on the main inductor $L_1$. On the other hand, if the voltage $V_{c1}$ becomes less than normal, the conducting periods of the first main switch $Q_1$ will become longer. Correspondingly more energy will be stored on the main inductor $L_1$ until the voltage $V_{c1}$ returns to normal.

The following is a discussion of d.c.-to-d.c. conversion by the action of the second main switch $Q_2$ in the absence of the ancillary soft-switching circuit 7. The voltage $V_{c1}$ across the smoothing capacitor $C_1$ will be impressed to the transformer primary $N_1$ upon conduction of the second main switch $Q_2$. The voltage induced then across the transformer secondary $N_2$ will be oriented to reverse-bias the diode $D_0$, holding the same nonconductive. The energy thus stored on the transformer 5 will be released upon subsequent nonconduction of the second main switch $Q_2$. The diode $D_0$ will then conduct, permitting the capacitor $C_0$ to be charged. Here again, if the power supply output voltage $V_0$ across the capacitor $C_0$ becomes higher than normal, the conducting periods of the second main switch $Q_2$ will become shorter. The output voltage $V_0$ will return to normal as correspondingly less energy is stored on the transformer 5. The conducting periods of the second main switch $Q_2$ will become longer when the output voltage $V_0$ becomes less than normal. Correspondingly more energy will then be stored on the transformer 5, causing the output voltage $V_0$ to return to normal.

Figure 5:
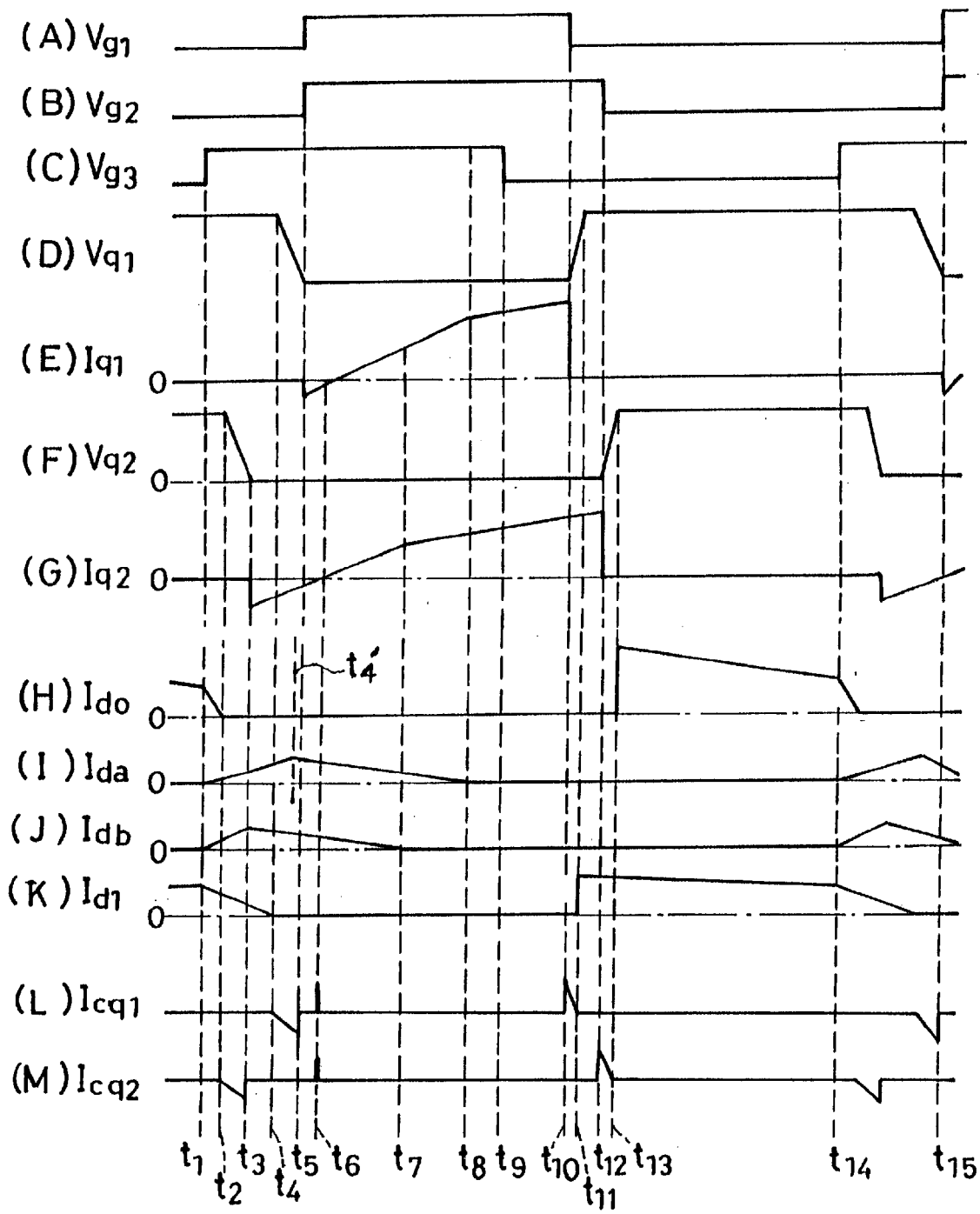
FIG. 5, consisting of (A) through (M), is a series of diagrams showing the voltage and current waveforms appearing at various parts of the FIG. 1 circuitry in order to explain soft switching.

Reference may be had to the waveform diagram of FIG. 5 for the following explanation of soft switching by the two main switches $Q_1$ and $Q_2$. The two main switches $Q_1$ and $Q_2$ and the two ancillary switches $Q_{3a}$ and $Q_{3b}$ are all off before $t_1$, as well as from $t_{13}$ to $t_{14}$, in FIG. 5, as indicated at (A), (B) and (C) in this figure. It has been stated that the smoothing capacitor $C_1$ will be charged by energy release from the main inductor $L_1$ during the nonconducting period of the first main switch $Q_1$. The current $I_{d1}$ will therefore flow through the diode $D_1$ as at (K) in FIG. 5. Since the second main switch $Q_2$ is also off, the current $I_{d0}$ will flow due to energy release from the transformer 5, along the path comprising the transformer secondary $N_2$, diode $D_0$, and capacitor $C_0$, as indicated at (H) in FIG. 5. The load 14 will be fed from the capacitor $C_0$.

The ancillary switch control signal $V_{g3}$ is shown to go high at $t_1$, as at (C) in FIG. 5, causing conduction through both first and second ancillary switches $Q_{3a}$ and $Q_{3b}$. Thereupon the voltages across these ancillary switches $Q_{3a}$ and $Q_{3b}$ will become practically zero. As a result, during the ensuing $t_1$–$t_2$ period, the current $I_{da}$ of FIG. 5(I) will flow along the path comprising the first rectifier output 43, main inductor $L_1$, first ancillary inductor $L_a$, first reverse-blocking diode $D_a$, first ancillary switch $Q_{3a}$, and second rectifier output 44. The current $I_{db}$ of FIG. 5(J) will also flow during the same $t_1$–$t_2$ period along the path comprising the smoothing capacitor $C_1$, transformer primary $N_1$, second ancillary inductor $L_b$, second reverse-blocking diode $D_b$, and second ancillary switch $Q_{3b}$. The currents $I_{da}$ and $I_{db}$ flowing through the respective ancillary switches $Q_{3a}$ and $Q_{3b}$ will gain in magnitude because of the presence of inductances in their paths. A zero-current turn-on of both ancillary switches $Q_{3a}$ and $Q_{3b}$ is thus accomplished, causing no power loss.

Upon conduction of the first ancillary switch $Q_{3a}$ at $t_1$ as above, the serial circuit of the first ancillary inductor $L_a$, first reverse-blocking diode $D_a$ and first ancillary switch $Q_{3a}$ will be connected in parallel with the serial circuit of the diode $D_1$ and smoothing capacitor $C_1$. The voltage $V_{c1}$ across the smoothing capacitor $C_1$ will be impressed to the junction $P_1$ between main inductor $L_1$ and first ancillary inductor $L_a$ via the diode $D_1$ as long as this diode is conductive. The first soft-switching capacitor $C_{q1}$ will therefore be clamped by the voltage $V_{c1}$ across the smoothing capacitor $C_1$ while the diode $D_1$ is conductive, so that the first soft-switching capacitor $C_{q1}$ will not start discharging immediately upon conduction of the first ancillary switch $Q_{3a}$ at $t_1$.

After $t_1$, when the first ancillary switch $Q_{3a}$ and rectifying diode $D_1$ are both conductive, the voltage $V_{c1}$ across the smoothing capacitor $C_1$ will be impressed via the diode $D_1$ to the serial circuit of the first ancillary inductor $L_a$, first reverse-blocking diode $D_a$ and first ancillary switch $Q_{3a}$. The current $I_{da}$ flowing through this serial circuit will gradually increase in magnitude as at (I) in FIG. 5. Since the serial circuit of the first ancillary inductor $L_a$, first reverse-blocking diode $D_a$ and first ancillary switch $Q_{3a}$ is connected as aforesaid in parallel with the serial circuit of the diode $D_1$ and smoothing capacitor $C_1$ when both rectifying diode $D_1$ and first ancillary switch $Q_{3a}$ are conductive after $t_1$, the current supplied by the main inductor $L_1$ will be divided between the two serial circuits. As indicated at (K) in FIG. 5, therefore, the current flowing through the rectifying diode $D_1$ will drop in magnitude more rapidly than before $t_1$.

The current supplied by the main inductor $L_1$ will decrease in magnitude upon voltage application to the first ancillary inductor $L_a$ at $t_1$ in FIG. 5 because the main inductor $L_1$ and first ancillary inductor $L_a$ are electromagnetically coupled together. The result will be a relatively rapid drop in the magnitude of the current $I_{d1}$ through the rectifying diode $D_1$, to zero at $t_4$ in FIG. 5.

At (J) in FIG. 5 is shown the current $I_{db}$ which flows along the path comprising the transformer primary $N_1$ and second ancillary inductor $L_b$ from $t_1$ to $t_2$. As a result, as indicated at (H) in FIG. 5, a gradual drop will occur, finally to zero at $t_2$, in the magnitude of the current $I_{d0}$ which is supplied to the diode $D_0$ from the transformer secondary $N_2$ electromagnetically coupled to the transformer primary $N_1$ and second ancillary inductor $L_b$.

At $t_2$, when the diode $D_0$ of the rectifying and smoothing circuit 6 becomes nonconductive, the transformer secondary $N_2$ will be unclamped from the voltage $V_0$ across the capacitor $C_0$. As the second soft-switching capacitor $C_{q2}$ is thus enabled to discharge, a resonance circuit will be completed which is constituted of the capacitance of the second soft-switching capacitor $C_{q2}$ and the inductance of the second ancillary inductor $L_b$. The discharge current $I_{cq2}$ of the second soft-switching capacitor $C_{q2}$ will flow along the path comprising the capacitor $C_{q2}$, second ancillary inductor $L_b$, second reverse-blocking diode $D_b$, and second ancillary switch $Q_{3b}$, as indicated at (M) in FIG. 5. As a result, as shown at (F) in FIG. 5, the voltage $V_{q2}$ across the second soft-switching capacitor $C_{q2}$ and second main switch $Q_2$ will diminish to zero at $t_3$.

During this $t_2$–$t_3$ period, as during the previous $t_1$–$t_2$ period, the current $I_{da}$ will flow along the path comprising the first rectifier output 43, main inductor $L_1$, first ancillary inductor $L_a$, first reverse-blocking diode $D_a$, first ancillary switch $Q_{3a}$, and second rectifier output 44. The current $I_{db}$ will flow along the path comprising the smoothing capacitor $C_1$, transformer primary $N_1$, second ancillary inductor $L_b$, second reverse-blocking diode $D_b$, and second ancillary switch $Q_{3b}$. The current $I_{d1}$ through the diode $D_1$ will also flow.

At $t_3$, when the second soft-switching capacitor $C_{q2}$ completes its discharge, the current $I_{q2}$ will start flowing as at (G) in FIG. 5 along the path comprising the second ancillary inductor $L_b$, second reverse-blocking diode $D_b$, second ancillary switch $Q_{3b}$, and second parallel diode $D_{q2}$, due to energy release from the second ancillary inductor $L_b$. The current $I_{q2}$ is shown at (G) in FIG. 5 as the sum of the current flowing through the drain and source of the second main switch $Q_2$ and the current through the second parallel diode $D_{q2}$. However, for ease of description, this current $I_{q2}$ will be hereinafter referred to as the current through the second main switch $Q_2$.

The drain-source voltage $V_{q2}$ of the second main switch $Q_2$ will remain zero, or very low, as long as the second parallel diode $D_{q2}$ is conductive. The voltage $V_{c1}$ across the smoothing capacitor $C_1$ will therefore be impressed to the transformer primary $N_1$. Electromagnetically coupled to the transformer primary $N_1$, the second ancillary inductor $L_b$ will also have impressed thereto a voltage oriented to decrease the current flowing therethrough. Thus, as indicated at (J) in FIG. 5, the current $I_{db}$ through the second reverse-blocking diode $D_b$ will start diminishing at $t_3$. The current $I_{d1}$ through the diode $D_1$ and the current $I_{da}$ through the first reverse-blocking diode $D_a$ will continue flowing from $t_3$ to $t_4$, as from $t_2$ to $t_3$.

The diode $D_1$ will become nonconductive at $t_4$ when the current $I_{d1}$ flowing through the diode $D_1$ into the smoothing capacitor $C_1$ becomes zero. Thereupon, unclamped from the smoothing capacitor $C_1$, the first soft-switching capacitor $C_{q1}$ will start discharging. The current $I_{cq1}$ through the first soft-switching capacitor $C_{q1}$ will flow as at (L) in FIG. 5. The current $I_{cq1}$ due to the discharge of the first soft-switching capacitor $C_{q1}$ will flow by the resonant circuit containing the capacitance of the first soft-switching capacitance $C_{q1}$ and the inductance of the first ancillary inductor $L_a$; that is, during the $t_4$–$t_5$ period, the discharge current $I_{cq1}$ will flow along the path sequentially comprising the first soft-switching capacitor $C_{q1}$, first ancillary inductor $L_a$, first reverse-blocking diode $D_a$, and first ancillary switch $Q_{3a}$.

As shown at (D) in FIG. 5, the voltage $V_{q1}$ across the first main switch $Q_1$ will start diminishing at $t_4$ with the progress of the discharge by the first soft-switching capacitor $C_{q1}$ until it becomes zero at $t_5$. In the course of such diminution of the first main switch voltage $V_{q1}$, the potential at the junction $P_1$ between main inductor $L_1$ and first ancillary inductor $L_a$ will equal the potential at the first output 43 of the rectifier circuit 4 approximately in the middle of the $t_4$–$t_5$ period, as indicated at $t_4'$ in FIG. 5. The potential at the junction $P_1$ will continue dropping thereafter below that at the first rectifier output 43.

Thus the voltage across the main inductor $L_1$ will be reversed in orientation at $t_4'$, and so will be the voltage across the first ancillary inductor $L_a$ because these two inductors are electromagnetically coupled together. As a result, as will be seen from (I) in FIG. 5, the current $I_{da}$ through the first ancillary inductor $L_a$ will start diminishing at $t_4'$.

At (A) and (B) in FIG. 5 are shown both first and second main switch control signals $V_{g1}$ and $V_{g2}$ as going high at $t_5$ to turn both main switches $Q_1$ and $Q_2$ on at that moment. Since the voltage $V_{q1}$ across the first main switch $Q_1$ drops to zero at $t_5$, as at (D) in FIG. 5, the first main switch $Q_1$ is turned on at zero voltage in order to save power. In practice, however, the first main switch $Q_1$ may be turned on at any moment from $t_5$ to $t_6$, when the first main switch voltage $V_{q1}$ remains zero. Speaking more broadly, the first main switch $Q_1$ may be turned on at any moment after $t_4$, when the voltage $V_{q1}$ across the same is not zero but less than that at $t_4$. For, even in this case, power loss at the turn-on of the first main switch $Q_1$ will be reduced to an extent to which the first main switch voltage $V_{q1}$ has dropped after $t_4$.

The second main switch $Q_2$ is turned on at the same moment as is the first main switch $Q_1$ for the simplicity of the switch control circuit 8, FIG. 2. The voltage $V_{q2}$ across the second main switch $Q_2$ has been zero since $t_3$, as at (F) in FIG. 5, so that the second main switch could be turned on at any moment since then. The current through the second parallel diode $D_{q2}$, connected in parallel with the second main switch $Q_2$, flows from $t_3$ to $t_6$ in this embodiment, during which period the voltage $V_{q2}$ across the second main switch is zero or very nearly so. Broadly, therefore, the second main switch $Q_2$ could be turned on at any moment from $t_3$ to $t_6$.

From $t_5$ to $t_6$, when the first main switch $Q_1$ is conductive, current will flow along the path comprising the first rectifier output 43, first inductor $L_1$, first main switch $Q_1$, and second rectifier output 44. At the same time the current $I_{da}$, FIG. 5(I), will also flow along the path comprising the first ancillary inductor $L_a$, first reverse-blocking diode $D_a$, first ancillary switch $Q_{3a}$, and first parallel diode $D_{q1}$.

At $t_6$, when the negative-going current through the first parallel diode $D_{q1}$ becomes zero as at (E) in FIG. 5, the current $I_{q1}$ will start flowing along the path comprising the first rectifier output 43, main inductor $L_1$, first main switch $Q_1$, and second rectifier output 44. The current $I_{q1}$ will increase in magnitude with time. The capacitor $C_1$ will not be charged then because the rectifying diode $D_1$ is nonconductive when the first main switch $Q_1$ is conductive. The liberation of the energy stored the first ancillary inductor $L_a$ is not yet complete at $t_6$ in this particular embodiment. The current $I_{da}$, FIG. 5(I), will continue to flow until $t_8$ for the complete release of that energy along the path comprising the first ancillary inductor $L_a$, first reverse-blocking diode $D_a$, first ancillary switch $Q_{3a}$, and first parallel diode $D_{q1}$.

After $t_6$, when the negative-going current through the second main switch $Q_2$ becomes zero, the current $I_{q2}$ will flow as at (G) in FIG. 5 along the path comprising the smoothing capacitor $C_1$, transformer primary $N_1$, and second main switch $Q_2$. Although the currents $I_{q1}$ and $I_{q2}$ through the two main switches $Q_1$ and $Q_2$ are shown at (E) and (G) in FIG. 5 as both going positive at $t_6$, they could do so at different moments. Generally, the current $I_{q2}$ will become zero earlier than $I_{q1}$.

The second ancillary inductor $L_b$ completes the release of its stored energy at $t_7$, rather than at $t_6$, in this particular embodiment. The residual energy will be released along the path comprising the second ancillary inductor $L_b$, second reverse-blocking diode $D_b$, second ancillary switch $Q_{3b}$, smoothing capacitor $C_1$, and transformer primary $N_1$.

The current $I_{db}$ through the second reverse-blocking diode $D_b$ is shown at (J) in FIG. 5 as becoming zero at $t_7$. The current $I_{da}$ through the first reverse-blocking diode $D_a$ is shown at (I) in FIG. 5 as becoming zero at $t_8$. During this $t_7$–$t_8$ period the current $I_{da}$ through the first reverse-blocking diode $D_a$ will flow through the first ancillary switch $Q_{3a}$.

Both ancillary switches $Q_{3a}$ and $Q_{3b}$ are shown turned off at $t_9$ when the ancillary switch control signal $V_{g3}$ goes low as at (C) in FIG. 5. The ancillary switches $Q_{3a}$ and $Q_{3b}$ will then be turned off at zero current because the currents through both ancillary switches have been zero since $t_8$. Speaking more broadly, the ancillary switches $Q_{3a}$ and $Q_{3b}$ may be turned off at any moment from $t_8$, when the currents therethrough become zero, to $t_{10}$ when the first main switch $Q_1$ turns on. The first main switch $Q_1$ is shown turned off earlier than the second $Q_2$ in FIG. 5. If, instead, the second main switch $Q_2$ is to be turned on earlier than the first $Q_1$, both ancillary switches $Q_{3a}$ and $Q_{3b}$ should be turned off earlier than the second main switch $Q_2$ is turned on.

Both main switches $Q_1$ and $Q_2$ are conductive, and both ancillary switches $Q_{3a}$ and $Q_{3b}$ nonconductive, from $t_9$ to $t_{10}$. Energy will therefore be stored on the main inductor $L_1$ by virtue of the current $I_{q1}$ through the first main switch $Q_1$, and on the transformer 5 by virtue of the current $I_{q2}$ through the second main switch $Q_2$.

At $t_{10}$, when the first main switch $Q_1$ is turned off as at (A) in FIG. 5, the current $I_{q1}$ through the first main switch will drop to zero as at (E) in the same figure. The current $I_{cq1}$, FIG. 5(L), will flow instead into the first soft-switching capacitor $C_{q1}$, charging the same, and the voltage $V_{q1}$ across this capacitor $C_{q1}$ and first main switch $Q_1$ will build up with a gradient as at (D) in FIG. 5. For this reason, even if the current $I_{q1}$ through the first main switch $Q_1$ decays with some delay because of the known storage action, less power loss will occur at the first main switch. The first main switch $Q_1$ will be turned off substantially at zero voltage.

The rectifying diode $D_1$ will conduct at $t_{11}$ when the voltage $V_{q1}$ across the first main switch $Q_1$ grows higher than the voltage $V_{c1}$ across the smoothing capacitor $C_1$. The current $I_{d1}$ will start flowing as at (K) in FIG. 5, and the smoothing capacitor $C_1$ will begin to be charged.

Figure 15:
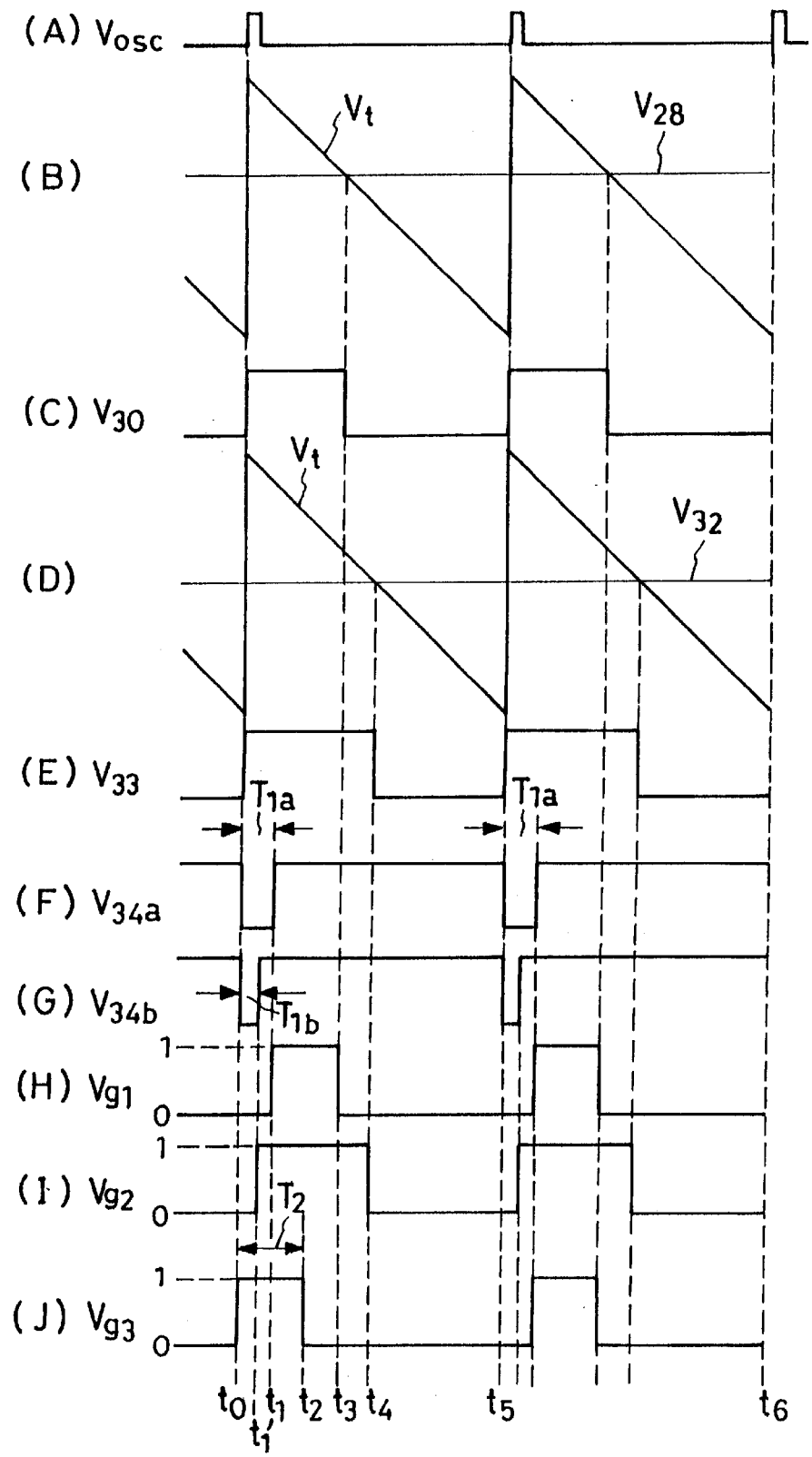
FIG. 15, consisting of (A) through (J), is a series of diagrams showing the voltage waveforms appearing at various parts of the FIG. 14 switch control circuit.

The current $I_{q2}$ through the second main switch $Q_2$ will drop to zero at $t_{12}$, as at (G) in FIG. 15, when the second main switch is turned off. The voltage $V_{q2}$ across the second soft-switching capacitor $C_{q2}$ and second main switch $Q_2$ will then develop with a gradient as at (F) in FIG. 5. Therefore, even if the current $I_{q2}$ decays belatedly by the storage action of the second main switch $Q_2$, less power loss will occur at this second main switch. In short the second main switch $Q_2$ will be turned off substantially at zero voltage.

What occurred immediately before $t_1$ in FIG. 5 will repeat itself from $t_{13}$ to $t_{14}$. The smoothing capacitor $C_1$ will be charged as the main inductor $L_1$ releases the energy that has been stored thereon. Also, as the energy that has been stored on the transformer 5 is released, the capacitor $C_0$ of the rectifying and smoothing circuit 6 will be charged from the transformer secondary $N_2$ via the diode $D_0$. One cycle of operation has come to an end at $t_{14}$. The same cycle will repeat itself after $t_{14}$.

The advantages gained by this FIGS. 1–5 embodiment may be recapitulated as follows:

1. The first ancillary inductor $L_a$ is connected in parallel with the first soft-switching capacitor $C_{q1}$ via the first ancillary switch $Q_{3a}$. The resonant circuit of the first soft-switching capacitor $C_{q1}$ and first ancillary inductor $L_a$ is formed when the first ancillary switch $Q_{3a}$ is turned on earlier than the first main switch $Q_1$ is turned on. The first soft-switching capacitor $C_{q1}$ completes its discharge earlier than the first main switch $Q_1$ is turned on. Thus is the first main switch $Q_1$ softly turned on for curtailment of power loss and noise production.

2. The second ancillary inductor $L_b$ is connected in parallel with the second soft-switching capacitor $C_{q2}$ via the second ancillary switch $Q_{3b}$. As this second ancillary switch $Q_{3b}$ is turned on earlier than the second main switch $Q_2$ is turned on, there is formed the resonance circuit of the second soft-switching capacitor $C_{q2}$ and second ancillary inductor $L_b$. The second soft-switching capacitor $C_{q2}$ completes its discharge earlier than the second main switch $Q_2$ is turned on. The second main switch $Q_2$ is thus softly turned on for minimal power loss and minimal noise production.

3. The first ancillary inductor $L_a$ with leakage inductance is wound on the same magnetic core as is the main inductor $L_1$. The resonant inductor is therefore manufacturable more compactly and inexpensively than if a discrete inductor were employed to provide the inductance for inductance-capacitance resonance.

4. The first ancillary inductor $L_a$ is electromagnetically coupled to the main inductor $L_1$. As a result, upon voltage application to the first ancillary inductor $L_a$ while the first ancillary switch $Q_{3a}$ is conductive, there is induced across the main inductor $L_1$ the voltage that is oriented to reduce the current flowing therethrough. The result is a rapid drop, starting from $t_1$, in the magnitude of the current $I_{d1}$ through the rectifying diode $D_1$, as indicated at (K) in FIG. 5.

5. Formed as a part of the transformer so as to possess leakage inductance, the second ancillary inductor $L_b$ constitutes a resonant circuit in combination with the second soft-switching capacitor $C_{q2}$. The inductor for resonance is thus manufacturable more compactly and inexpensively than as a discrete unit.

6. The second ancillary inductor $L_b$ is electromagnetically coupled to the transformer primary $N_1$ and secondary $N_2$. Therefore, by turning on the second ancillary switch $Q_{3b}$ at $t_1$ in FIG. 5 for current flow through the second ancillary inductor $L_b$, the current $I_{d0}$ through the diode $D_0$ of the rectifying and smoothing circuit 6 can be caused to drop rapidly in magnitude from $t_1$.

7. The two ancillary switches $Q_{3a}$ and $Q_{3b}$ are both under the direction of the same switch control signal $V_{g3}$ from the switch control circuit 8. The soft turn-on of the two main switches $Q_1$ and $Q_2$ is accomplished by the simplest possible circuitry.

8. The two main switches $Q_1$ and $Q_2$ are both driven at the same repetition frequency, thereby preventing them unstable operation and noise production resulting from mutual frequency interference in the case where two different frequencies were employed for driving them.

9. The control signals $V_{g1}$ and $V_{g2}$ for the two main switches $Q_1$ and $Q_2$ are capable of fabrication by relatively simple circuit means shown in FIG. 2, as they are turned on simultaneously.

Figure 6:
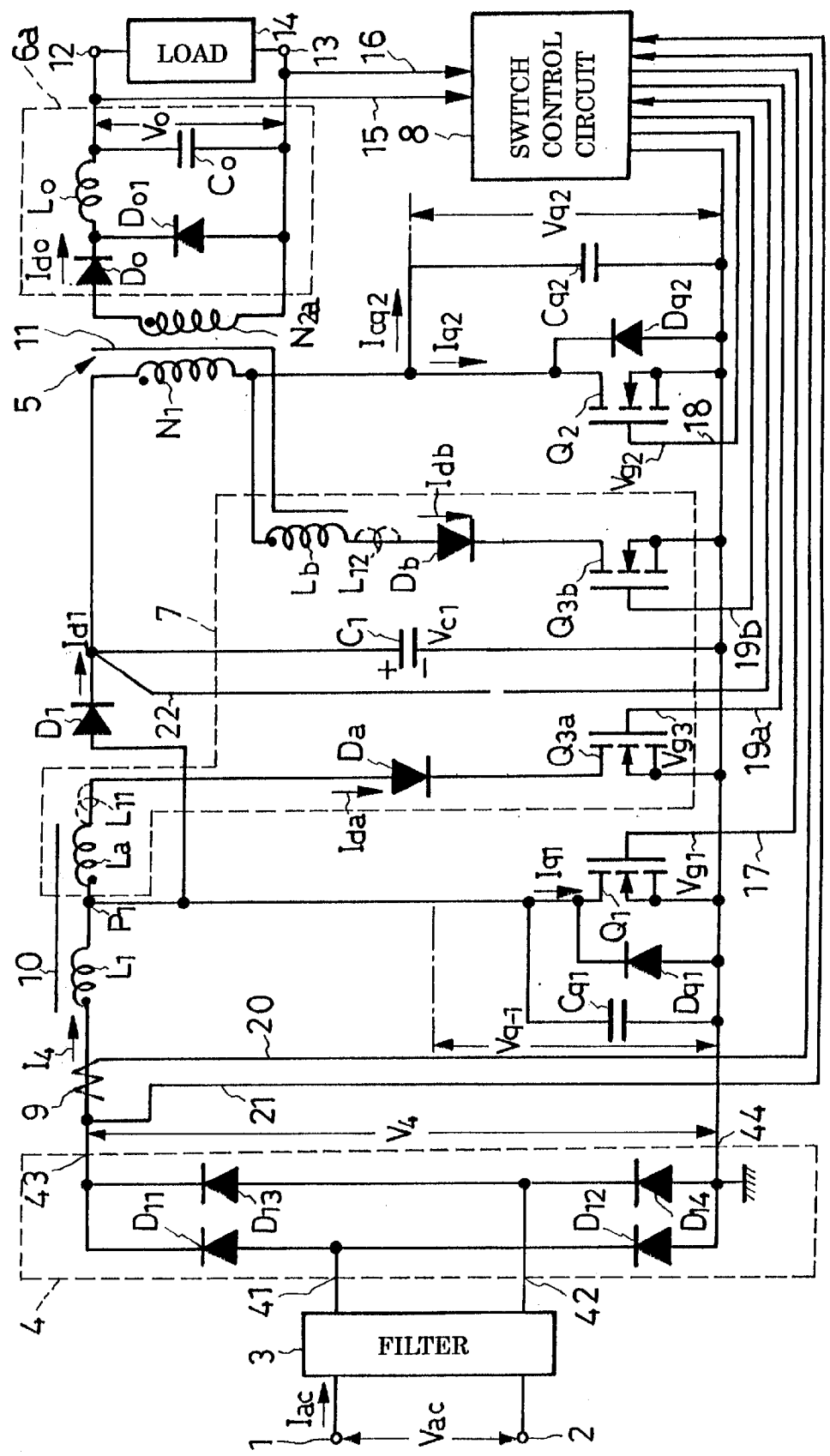
FIG. 6 is a view similar to FIG. 1 but showing a second preferred form of switching power supply according to the invention.
Figure 7:
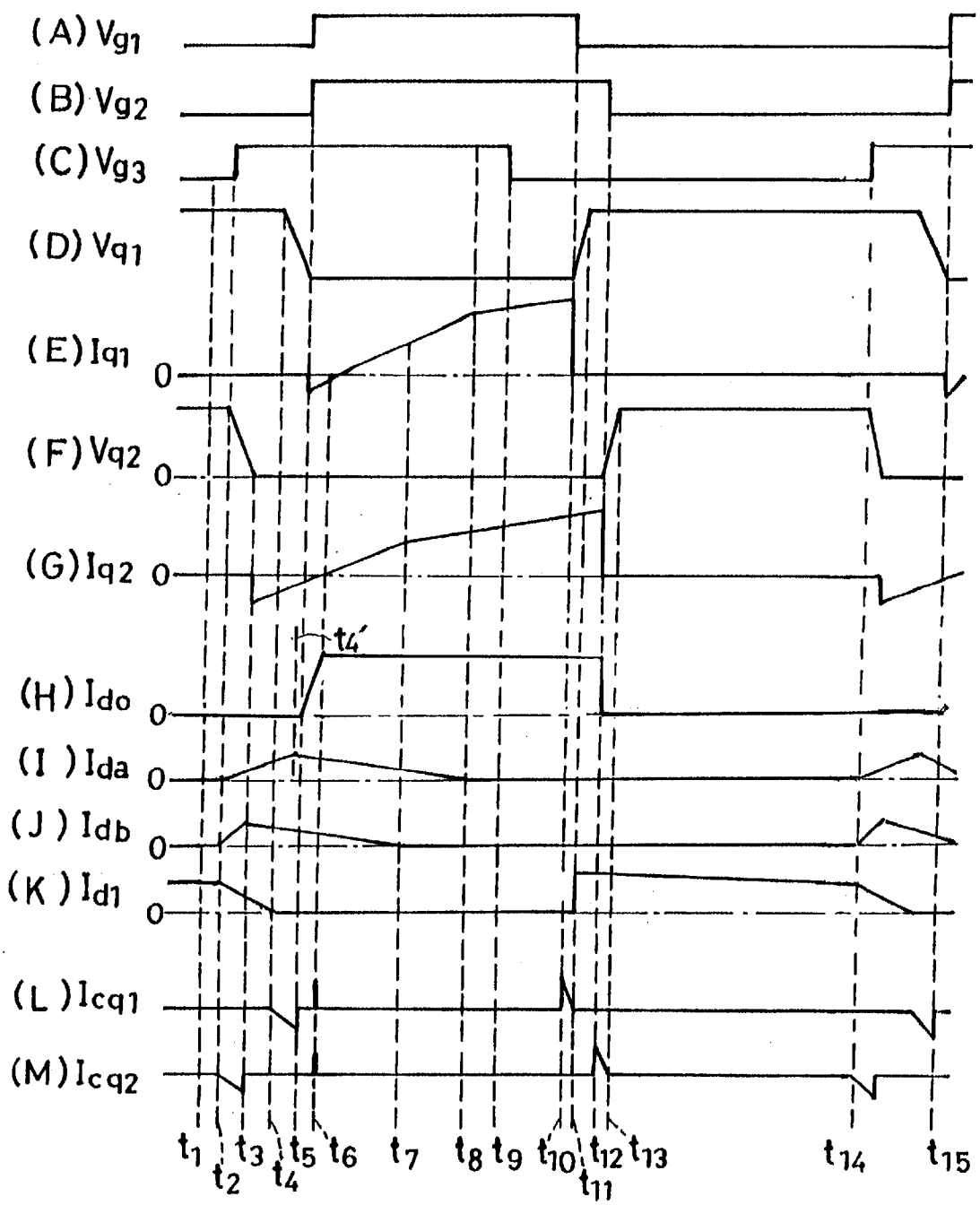
FIG. 7, consisting of (A) through (M), is a series of diagrams showing the voltage and current waveforms appearing at various parts of the FIG. 6 circuitry.

Embodiment of FIGS. 6 and 7

The FIG. 6 power supply differs from that of FIG. 1 in incorporating a modified rectifying and smoothing circuit $6_a$ in substitution for its FIG. 1 counterpart 6 and having a transformer secondary $N_{2a}$ which is opposite in polarity to its FIG. 1 counterpart $N_2$. The circuit configuration from the pair of input terminals 1 and 2 to the primary winding $N_1$ of the transformer 5 of the FIG. 6 device is akin to that of FIG. 1. The d.c.-to-d.c. converter circuit including the second main switch $Q_2$ in this alternate embodiment is what is known as the forward d.c.-to-d.c. converter, causing conduction through the diode $D_0$ by the voltage developing across the transformer secondary $N_{2a}$ when the second main switch $Q_2$ is conductive.

The modified rectifying and smoothing circuit $6_a$ comprises a smoothing inductor $L_0$ and a smoothing diode $D_{01}$, in addition to the diode $D_0$ and the smoothing capacitor $C_0$. The inductor $L_0$ is connected between diode $D_0$ and capacitor $C_0$. The smoothing diode $D_{01}$ is connected in parallel with the inductor $L_0$ via the capacitor $C_0$.

In the operation of the FIG. 6 embodiment the voltage across the smoothing capacitor $C_1$ will be impressed to the transformer primary $N_1$ during the conducting periods of the second main switch $Q_2$. The voltage developing across the transformer secondary $N_{2a}$ will cause conduction through the diode $D_0$ thereby permitting the smoothing capacitor $C_0$ to be charged. The diode $D_0$ will be nonconductive when the second main switch $Q_2$ is off.

The ancillary soft-switching circuit 7 being of the same construction as its FIG. 1 counterpart, it will be seen that the soft switching of the two main switches $Q_1$ and $Q_2$ is accomplished just as previously explained in conjunction with the FIG. 1 embodiment. FIG. 7 is similar to FIG. 5, showing the waveforms of the voltage and current signals appearing at various parts of the FIG. 6 circuitry, which signals are the same as those given in FIG. 5. In FIG. 7, however, the ancillary switch control signal $V_{g3}$ for both ancillary switches $Q_{3a}$ and $Q_{3b}$ is shown at (C) as going high at $t_2$, instead of at $t_1$ as in FIG. 5. As voltages across the ancillary switches $Q_{3a}$ and $Q_{3b}$ both drop to zero at $t_2$, the current $I_{da}$ through the first reverse-blocking diode $D_a$ and the current $I_{db}$ through the second reverse-blocking diode $D_b$ will both start flowing at $t_2$, as at (I) and (J) in FIG. 7. The d.c.-to-d.c. converter circuit including the second main switch $Q_2$ being of the "forward" design, the current $I_{d0}$ through the diode $D_0$ of the modified rectifying and smoothing circuit $6_a$ will flow from $t_5$ to $t_{12}$ as at (H) in FIG. 7.

Upon conduction of the two ancillary switches $Q_{3a}$ and $Q_{3b}$, current will immediately start flowing along the path comprising the second soft-switching capacitor $C_{q2}$, second ancillary inductor $L_b$, second reverse-blocking diode $D_b$, and second ancillary switch $Q_{3b}$. The second soft-switching capacitor $C_{q2}$ will thus start discharging. The subsequent soft-switching of the two main switches $Q_1$ and $Q_2$ will proceed just as previously discussed with reference to FIG. 5. Thus the FIG. 6 embodiment gains the same advantages as that of FIG. 1.

Figure 8:
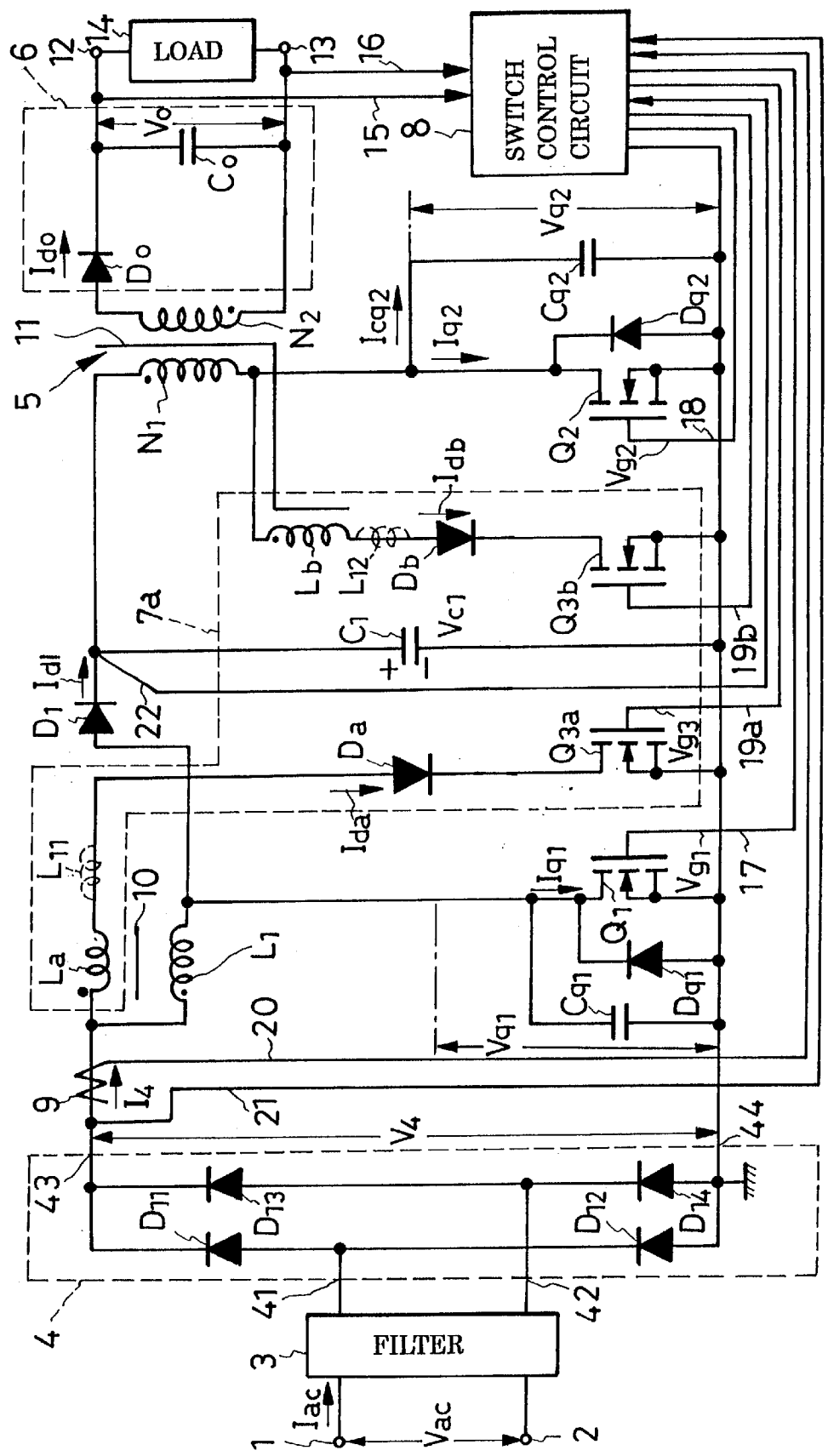
FIG. 8 is a view similar to FIG. 1 but showing a third preferred form of switching power supply according to the invention.

Embodiment of FIG. 8

The switching power supply shown in FIG. 8 is similar to that of FIG. 1 except for a modified ancillary soft-switching circuit $7_a$. This modified circuit $7_a$ has the main inductor $L_1$ and the first ancillary inductor $L_a$ interconnected in parallel, instead of in series as in FIG. 1. However, as in the FIG. 1 embodiment, the first ancillary inductor $L_a$ is wound on the same core 10 as the main inductor $L_1$ so as to possess leakage inductance, and both inductors are electromagnetically coupled together. Each of the inductors $L_1$ and $L_a$ has one extremity thereof connected to the first output 43 of the rectifier circuit 4.

The basic operation of the FIG. 8 power supply, as well as that of the ancillary soft-switching circuit 7, is as set forth above in connection with the FIG. 1 embodiment. The FIG. 5 voltage and current waveforms appearing at various parts of the FIG. 1 circuitry also appear at the same parts of that of FIG. 8. The operation of the FIG. 8 embodiment will therefore be explained with reference to FIG. 5. The first ancillary switch $Q_{3a}$ being conductive during the $t_1$–$t_2$ period in FIG. 5, the current $I_{da}$ will flow as at (I) in this figure along the path comprising the first rectifier output 43, first ancillary inductor $L_a$, first reverse-blocking diode $D_a$, first ancillary switch $Q_{3a}$, and second rectifier output 44. The current $I_{db}$ will also flow as at (J) in FIG. 5 along the path comprising the smoothing capacitor $C_1$, transformer primary $N_1$, second ancillary inductor $L_b$, second reverse-blocking diode $D_b$, and second ancillary switch $Q_{3b}$.

The main inductor $L_1$ continues its energy liberation during this $t_1$–$t_2$ period, as before $t_1$. By virtue of this energy liberation the current $I_{d1}$ will flow as at (K) in FIG. 5 to the smoothing capacitor $C_1$ via the rectifying diode $D_1$, and the current $I_{da}$ will also flow as at (I) in FIG. 5 through the first ancillary inductor $L_a$ electromagnetically coupled to he main inductor $L_1$. As a result, in this FIG. 8 embodiment too, the current $I_{d1}$ through the rectifying diode $D_1$ will flow as at (K) in FIG. 5 with a steeper gradient than before upon conduction of the ancillary switch $Q_{3a}$.

The voltage $V_{q2}$ across the second main switch $Q_2$ will drop to zero by resonance during the $t_2$–$t_3$ period. The first soft-switching capacitor $C_{q1}$ will be set free from clamping by the voltage $V_{c1}$ across the smoothing capacitor $C_1$ at $t_4$ when the rectifying diode $D_1$ becomes nonconductive. As a consequence, during the ensuing $t_4$–$t_5$ period, resonance current will flow along the path comprising the first soft-switching capacitor $C_{q1}$, main inductor $L_1$, first ancillary inductor $L_a$, first reverse-blocking diode $D_a$, and first ancillary switch $Q_{3a}$. As the energy is thus transferred from first soft-switching capacitor $C_{q1}$ to first ancillary inductor $L_a$, the voltage $V_{q1}$ across the first soft-switching capacitor $C_{q1}$ and first main switch $Q_1$ will drop to zero at $t_5$. A zero-voltage switching of both main switches $Q_1$ and $Q_2$ will therefore be achieved by turning these switches on at $t_5$ or, more broadly, from $t_5$ to $t_6$.

Figure 9:
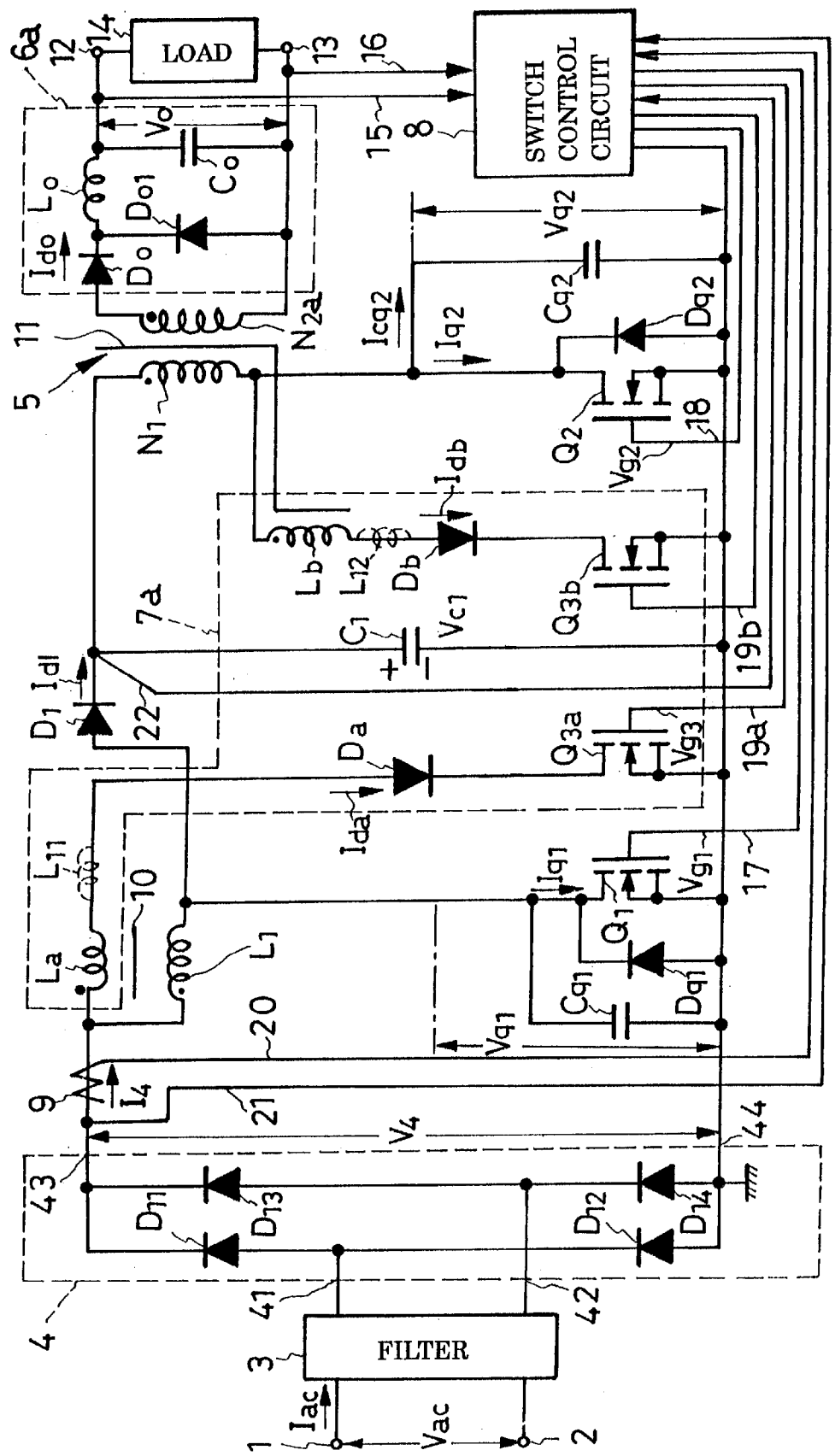
FIG. 9 is also a view similar to FIG. 1 but showing a fourth preferred form of switching power supply according to the invention.

Embodiment of FIG. 9

The FIG. 9 embodiment differs from that of FIG. 8 in having a modified rectifying and smoothing circuit $6_a$ in place of its FIG. 8 counterpart 6, and in having a transformer secondary $N_{2a}$ which is opposite in polarity from its FIG. 8 counterpart $N_2$.

The circuit configuration from the pair of input terminals 1 and 2 to the primary winding $N_1$ of the transformer 5 of the FIG. 9 embodiment is akin to that of FIG. 8. The d.c.-to-d.c. converter circuit including the second main switch $Q_2$ in this FIG. 9 embodiment is similar to the forward converter circuit of FIG. 6. The rectifying and smoothing circuit $6_a$ and transformer secondary $N_{2a}$ are therefore analogous in construction and operation with those designated by the same reference characters in FIG. 6. The main inductor $L_1$ and second ancillary inductor $L_a$ of FIG. 9 are the same in construction and connections as those of FIG. 8. The two main switches $Q_1$ and $Q_2$ and two ancillary switches $Q_{3a}$ and $Q_{3b}$ of FIG. 9 are controlled just like their FIG. 6 counterparts. Consequently, the same voltage and current waveforms as those given in FIG. 7 appear in the FIG. 9 embodiment. The operation of this embodiment will therefore be described with reference to FIG. 7.

From $t_2$ to $t_3$ in FIG. 7, when the first ancillary switch $Q_{3a}$ is conductive as at (C) in this figure, the current $I_{da}$ will flow as at (I) in FIG. 7 along the path comprising the first rectifier output 43, first ancillary inductor $L_a$, first reverse-blocking diode $D_a$, first ancillary switch $Q_{3a}$, and second rectifier output 44. At the same time the current $I_{db}$ will also flow as at (J) in FIG. 7 along the path comprising the smoothing capacitor $C_1$, transformer primary $N_1$, second ancillary inductor $L_b$, second reverse-blocking diode $D_b$, and second ancillary switch $Q_{3b}$.

Energy release from the main inductor $L_1$ continues in this $t_2$–$t_3$ period, as before $t_2$. This energy release will cause the current $I_{d1}$ to flow to the smoothing capacitor $C_1$ via the rectifying diode $D_1$, as at (K) in FIG. 7, and the current $I_{da}$ to flow to the first ancillary inductor $L_a$, as at (I) in FIG. 7. As a result, in this FIG. 9 embodiment too, the current $I_{d1}$ through the rectifying diode $D_1$ will decrease in magnitude more rapidly than before upon conduction of the two ancillary switches $Q_{3a}$ and $Q_{3b}$, as at (K) in FIG. 7.

The voltage $V_{q2}$ across the second main switch $Q_2$ will drop approximately to zero by resonance during the $t_2$–$t_3$ period, as in the FIG. 1 embodiment. The first soft-switching capacitor $C_{q1}$ will be unclamped from the voltage $V_{c1}$ across the smoothing capacitor $C_1$ at $t_4$ when the rectifying diode $D_1$ becomes nonconductive. Resonance current will flow during the ensuing $t_4$–$t_5$ period along the path comprising the first soft-switching capacitor $C_{q1}$, main inductor $L_1$, first ancillary inductor $L_a$, first reverse-blocking diode $D_a$, and first ancillary switch $Q_{3a}$. Energy transfer will thus occur from first soft-switching capacitor $C_{q1}$ to first ancillary inductor $L_a$. The voltage $V_{q1}$ across the first soft-switching capacitor $C_{q1}$ and first main switch $Q_1$ will drop to zero at $t_5$. The two main switches $Q_1$ and $Q_2$ may therefore be turned on at zero voltage at $t_5$ or at any moment from $t_5$ to $t_6$.

Figure 10:
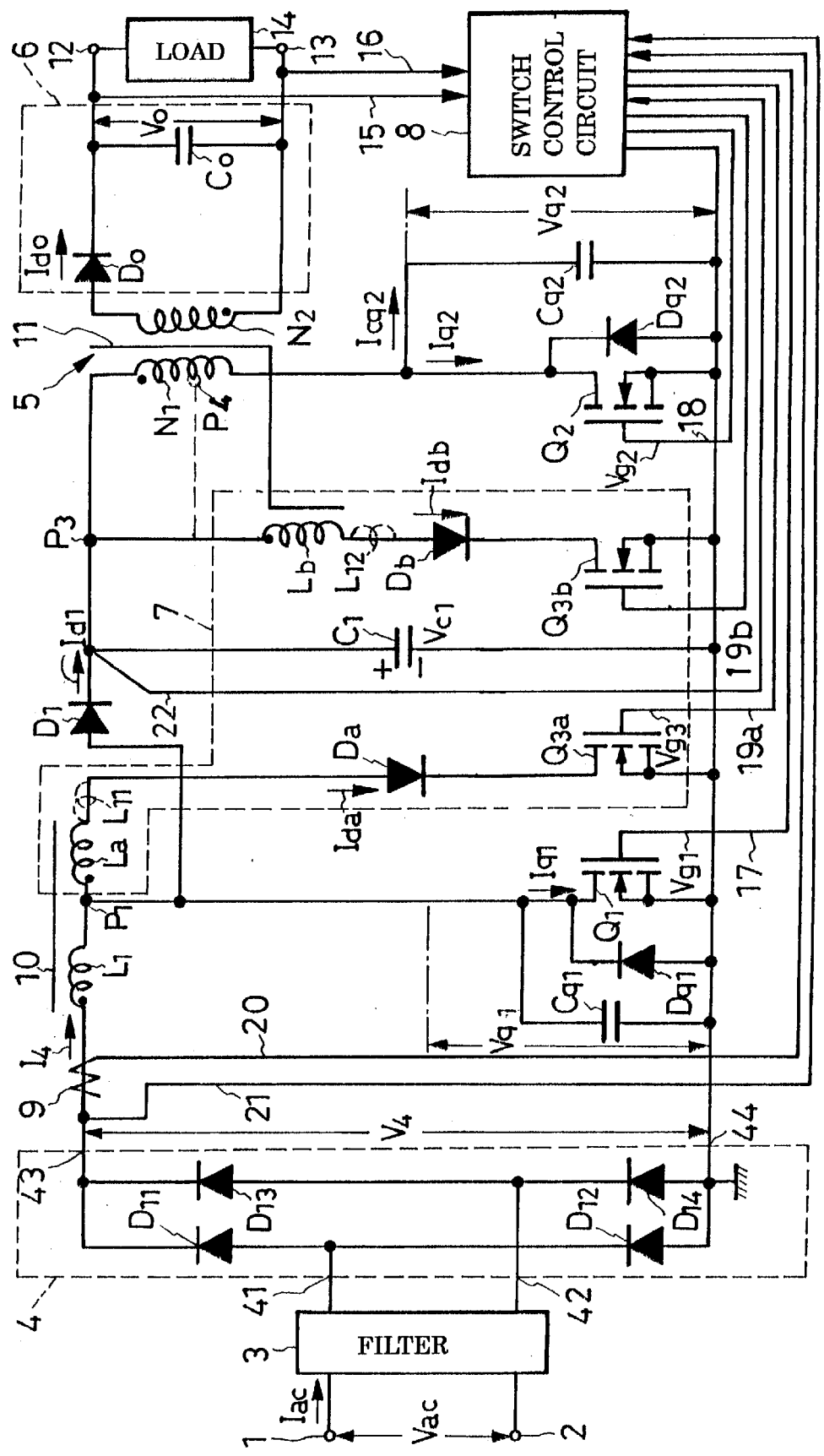
FIG. 10 is also a view similar to FIG. 1 but showing a fifth preferred form of switching power supply according to the invention.

Embodiment of FIG. 10

The FIG. 10 embodiment is identical with that of FIG. 1 except that the second ancillary inductor $L_b$ is connected to a junction $P_3$ between transformer primary $N_1$ and smoothing capacitor $C_1$, instead of to the junction $P_2$ between transformer primary $N_1$ and second main switch $Q_2$ as in FIG. 1. This embodiment is therefore similar in operation to that of FIG. 1 except for a slight difference in the flow path of the current $I_{db}$ through the reverse-blocking diode $D_b$.

The operation of the FIG. 10 embodiment will be best understood by referring to FIG. 5 again. From $t_1$ to $t_7$ in this figure, current will flow along the path comprising the smoothing capacitor $C_1$, second ancillary inductor $L_b$, second reverse-blocking diode $D_b$, and second ancillary switch $Q_{3b}$. Current will also flow from $t_2$ to $t_3$ along the path comprising the second soft-switching capacitor $C_{q2}$, transformer primary $N_1$, second ancillary inductor $L_b$, second reverse-blocking diode $D_b$, and second ancillary switch $Q_{3b}$. Current will also flow from $t_3$ to $t_7$ along the path comprising the second ancillary inductor $L_b$, second reverse-blocking diode $D_b$, second ancillary switch $Q_{3b}$, second parallel diode $D_{q2}$, and transformer primary $N_1$. In this FIG. 10 power supply, too, the voltage $V_{q2}$ across the second main switch $Q_2$ will diminish from $t_2$ to $t_3$ by reason of the resonance of the second soft-switching capacitor $C_{q2}$ and second ancillary inductor $L_b$. The second main switch $Q_2$ may therefore be turned on at zero voltage after $t_3$ in FIG. 5.

As an additional modification of the FIG. 10 embodiment, the second ancillary inductor $L_b$ may have one extremity thereof connected to a tap $P_4$ on the transformer primary $N_1$, as indicated by the broken line in FIG. 10, instead of to the junction $P_3$. The resonance due to the second soft-switching capacitor $C_{q2}$ and the second ancillary inductor $L_b$ will then occur just as when the second ancillary inductor $L_b$ is connected to the junction $P_3$.

Figure 11:
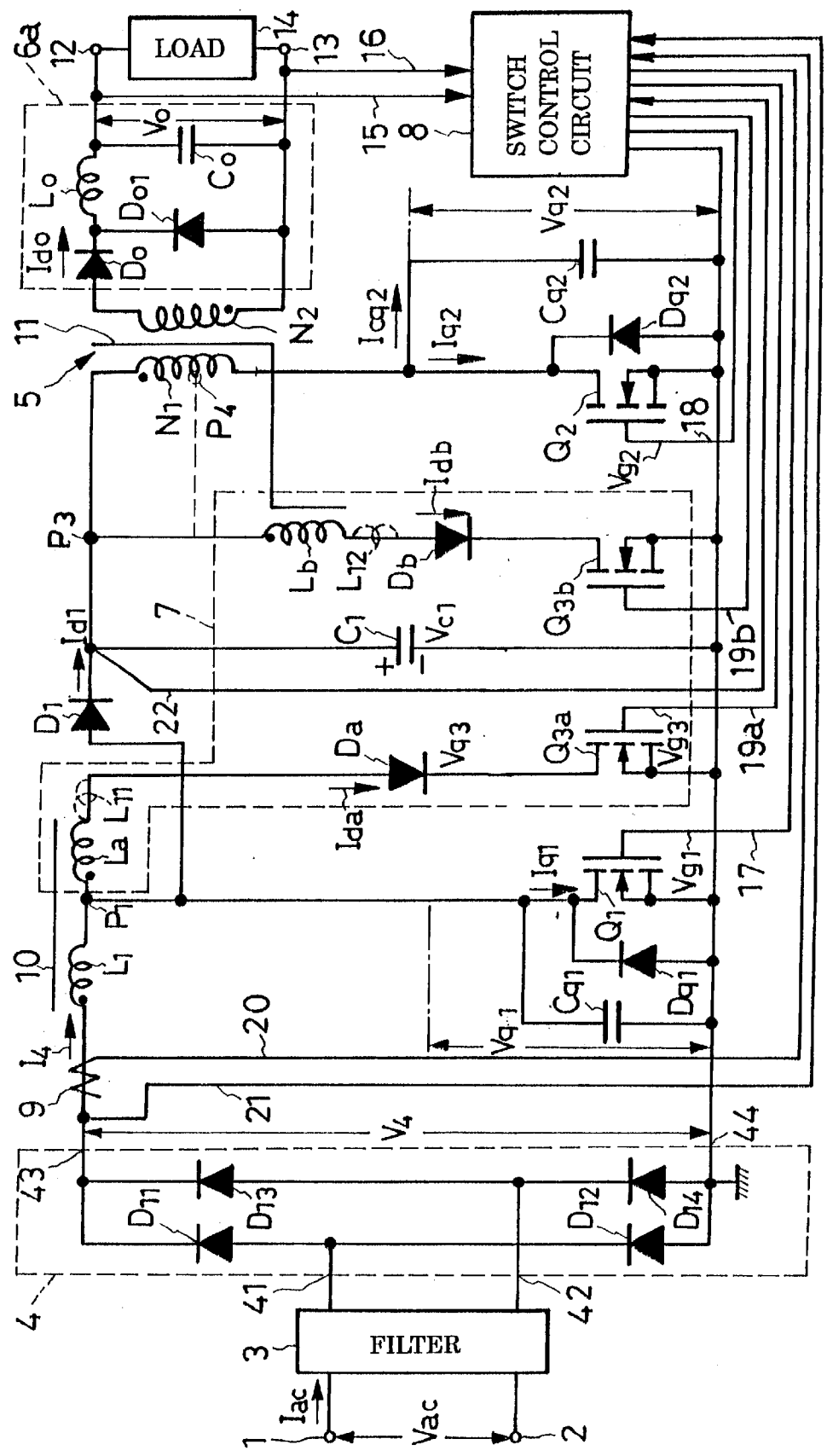
FIG. 11 is also a view similar to FIG. 1 but showing a sixth preferred form of switching power supply according to the invention.

Embodiment of FIG. 11

The FIG. 11 embodiment is identical with that of FIG. 6 except that the second ancillary inductor $L_b$ has one of its opposite extremities coupled to the junction $P_3$ between transformer primary $N_1$ and smoothing capacitor $C_1$, instead of to the junction between transformer primary $N_1$ and second main switch $Q_2$. The relationship between transformer primary $N_1$ and second ancillary inductor $L_b$ in FIG. 11 is analogous with that in FIG. 10, so that current will flow through the second ancillary inductor $L_b$ and second reverse-blocking diode $D_b$ in FIG. 41 along the same paths as in FIG. 10. Thus the FIG. 11 embodiment wins the same advantages as does that of FIG. 6. Incidentally, in this FIG. 11 embodiment too, the second ancillary inductor $L_b$ could be connected to a tap $P_4$ on the transformer primary $N_1$.

Figure 12:
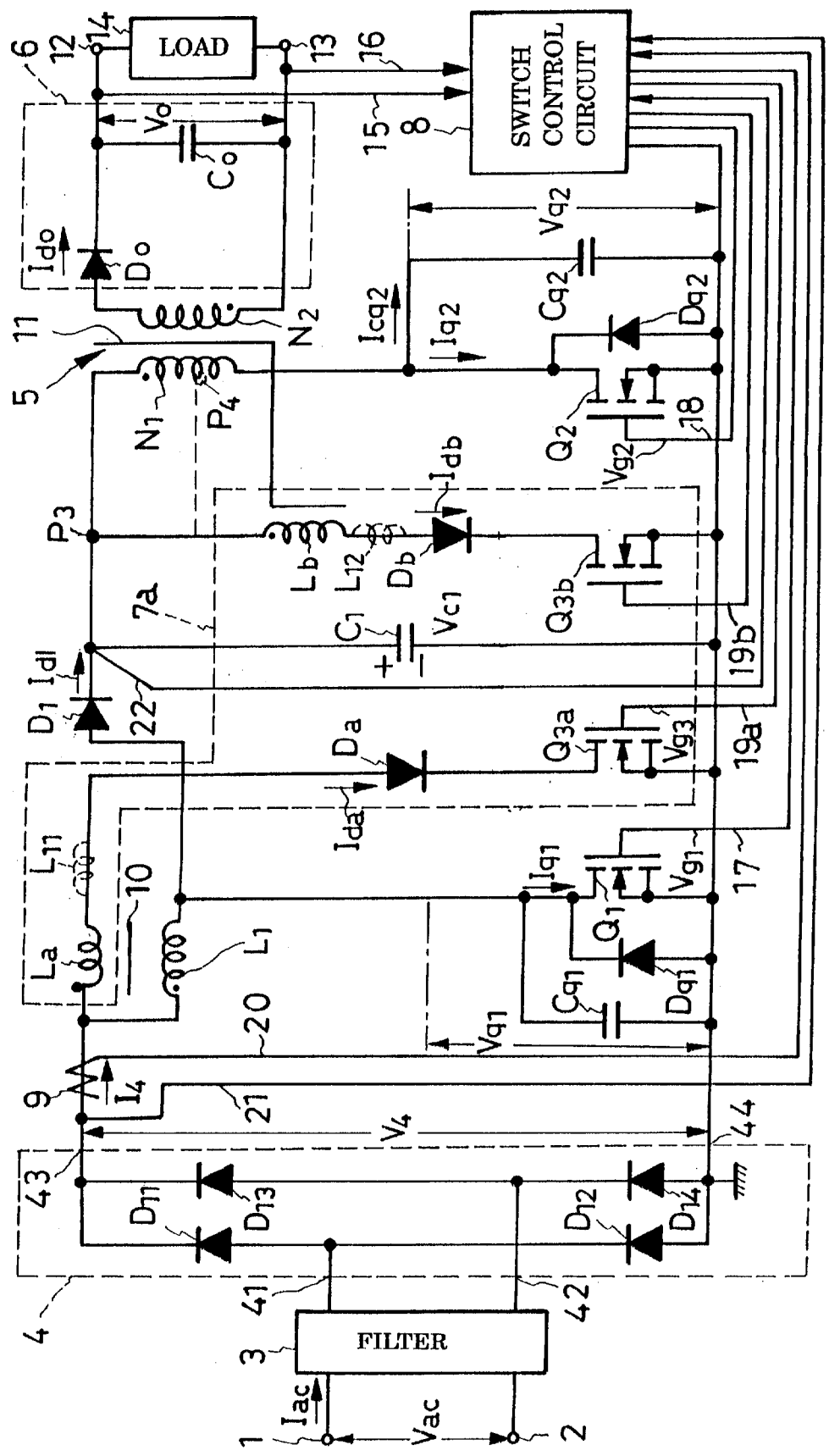
FIG. 12 is also a view similar to FIG. 1 but showing a seventh pre-preferred form of switching power supply according to the invention.

Embodiment of FIG. 12

The FIG. 12 embodiment is identical with that of FIG. 8 except that the second ancillary inductor $L_b$ has one of its opposite extremities coupled to the junction $P_3$ between transformer primary $N_1$ and smoothing capacitor $C_1$, instead of to the junction between transformer primary $N_1$ and second main switch $Q_2$. The relationship between transformer primary $N_1$ and second ancillary inductor $L_b$ in FIG. 12 is analogous with that in FIG. 10, so that current will flow through the second ancillary inductor $L_b$ and second reverse-blocking diode $D_b$ in FIG. 12 along the same paths as in FIG. 10. Thus the FIG. 12 embodiment wins the same advantages as does that of FIG. 8. In this FIG. 12 embodiment, too, the second ancillary inductor $L_b$ could be connected to a tap $P_4$ on the transformer primary $N_1$.

Figure 13:
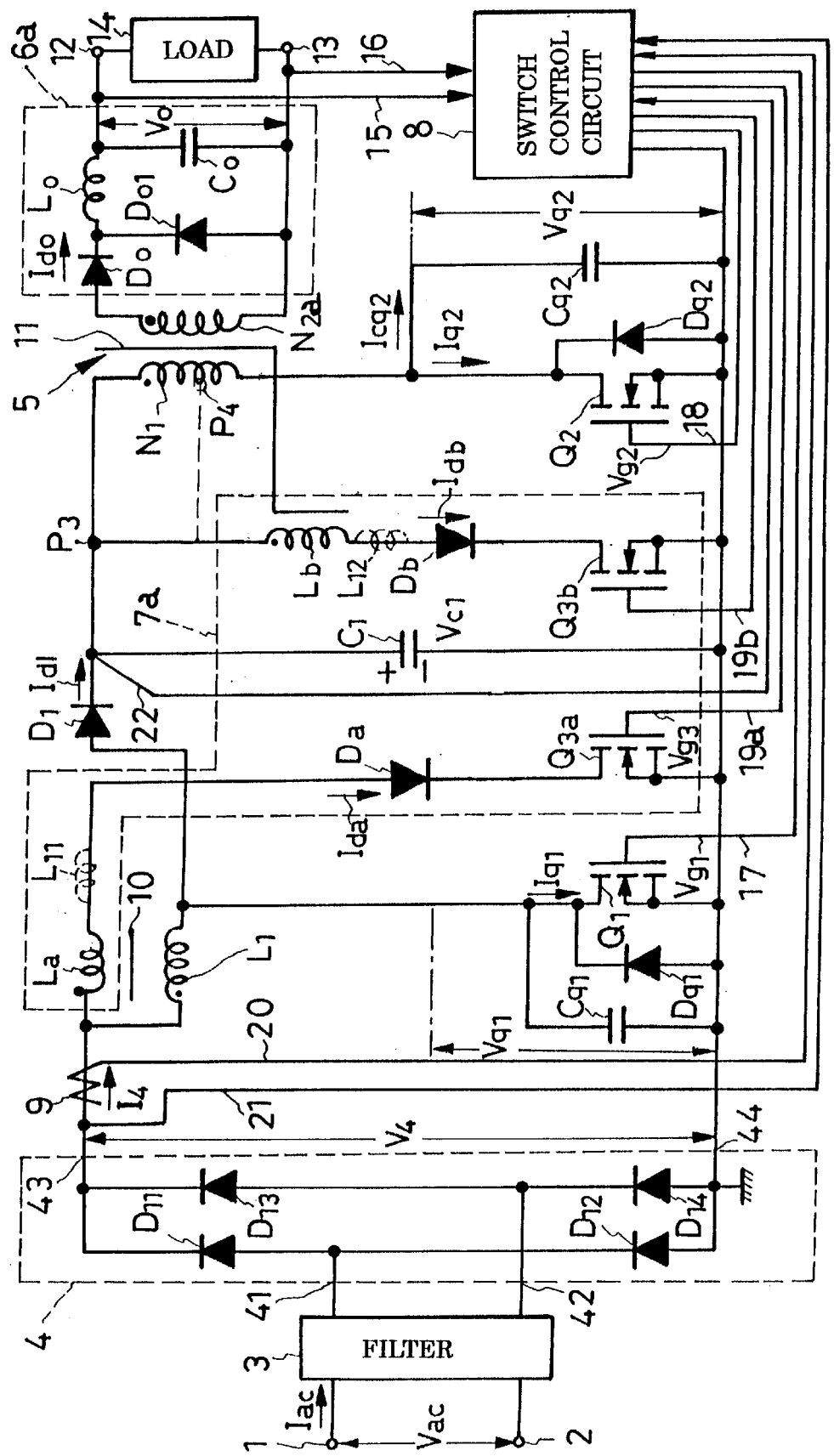
FIG. 13 is also a view similar to FIG. 1 but showing an eighth preferred form of switching power supply according to the invention.

Embodiment of FIG. 13

The FIG. 13 embodiment is identical with that of FIG. 9 except that the second ancillary inductor $L_b$ has one of its opposite extremities coupled to the junction $P_3$ between transformer primary $N_1$ and smoothing capacitor $C_1$, instead of to the junction between transformer primary $N_1$ and second main switch $Q_2$. The relationship between transformer primary $N_1$ and second ancillary inductor $L_b$ in FIG. 13 is analogous with that in FIG. 10, so that current will flow through the second ancillary inductor $L_b$ and second reverse-blocking diode $D_b$ in FIG. 13 along the same paths as in FIG. 10.

Figure 14:
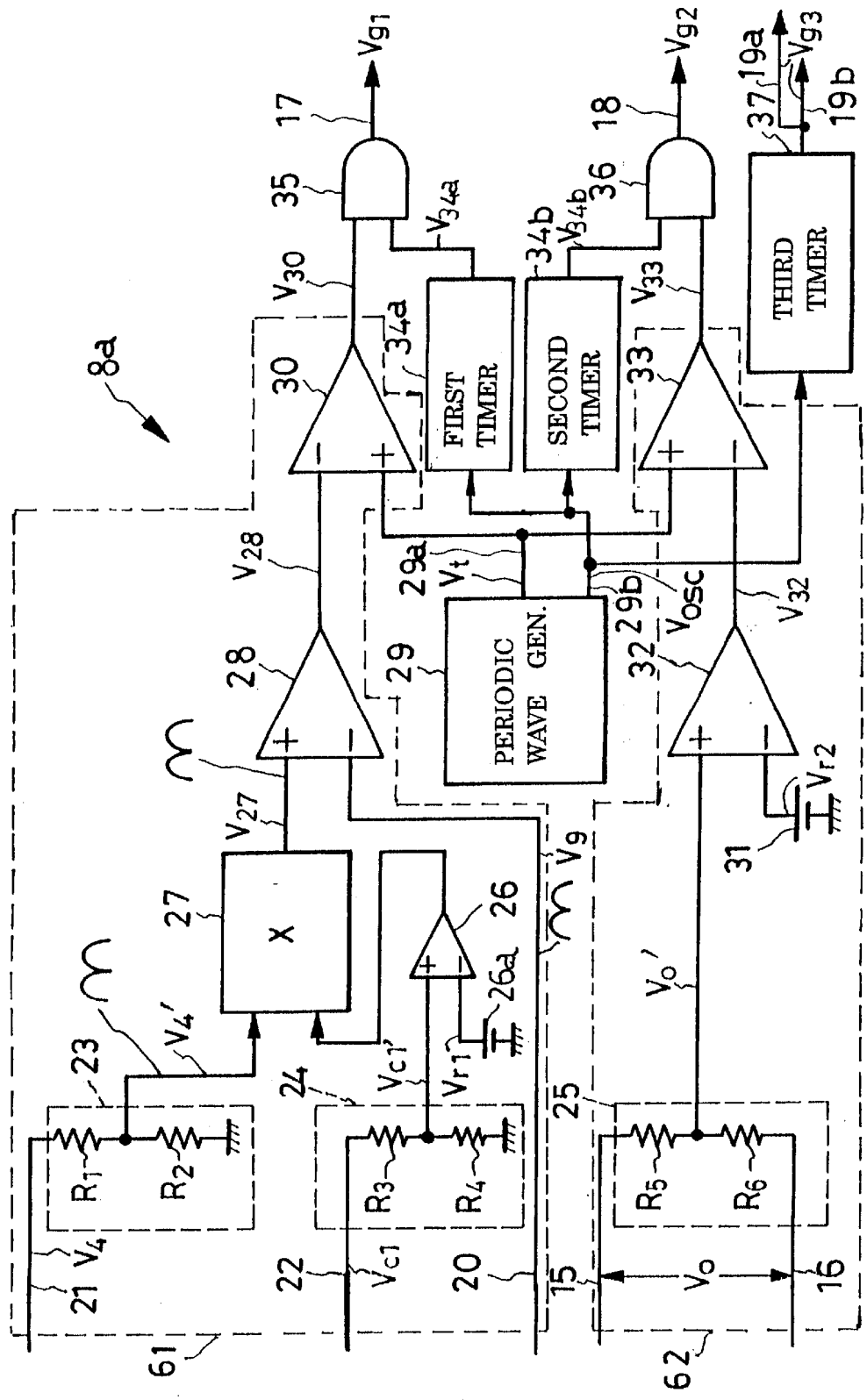
FIG. 14 is a view similar to FIG. 2 but showing a modified switch control circuit for use in any of the foregoing forms of switching power supplies in place of the FIG. 2 switch control circuit.

Embodiment of FIG. 14

In FIG. 14 is shown a modified switch control circuit $8_a$ for use in substitution for the first disclosed switch control circuit 8, FIG. 2, in any of the foregoing forms of switching power supplies according to the invention. The modified switch control circuit $8_a$ has two timers $34_a$ and $34_b$, in place of the first timer 34 of the FIG. 2 circuit, for differently limiting the conducting periods of the two main switches $Q_1$ and $Q_2$. The first timer $34_a$ is connected between periodic wave generator 29 and first AND gate 35. The second timer $34_b$ is connected between periodic wave generator 29 and second AND gate 36. The modified switch control circuit $8_a$ is similar to its FIG. 2 counterpart 8 in all the other details of construction. What is labeled "third timer" and designated 37 in FIG. 14 is therefore equivalent to the second timer bearing the same reference numeral in FIG. 2, putting out the ancillary switch control signal $V_{g3}$ for delivery over the conductors $19_a$ and $19_b$ to the gates of both ancillary switches $Q_{3a}$ and $Q_{3b}$.

FIG. 15 depicts the voltage waveforms appearing at various parts of the FIG. 14 switch control circuit $8_a$, just as FIG. 3 does for the FIG. 2 switch control circuit 8. The waveforms (A) through (E) in FIG. 15 are equivalent to those shown at (A) through (E) in FIG. 3. Seen at (F) in FIG. 15 are the "negative" output pulses $V_{34a}$ of the first timer $34_a$ each having a first prescribed duration $T_{1a}$, and at (G) the "negative" output pulses $V_{34b}$ of the second timer $34_b$ each having a second prescribed duration $T_{1b}$. Triggered by an output pulse $V_{osc}$ of the unshown clock in the periodic wave generator 29, both timers $34_a$ and $34_b$ go low at $t_0$, but the second timer $34_b$ goes back high at $t_1'$, earlier than $t_1$ when the first timer $34_a$ does so. However, these showings of FIG. 15 are by way of example only: The first timer output pulses $V_{34a}$ may be each shorter in duration than each second timer output pulse $V_{34b}$.

The first AND gate 35 puts out the first main switch control signal $V_{g1}$, FIG. 15(H), as the logical product of the output voltage $V_{30}$, FIG. 15 (C), of the comparator 30 and the output voltage $V_{34a}$, FIG. 15(F), of the first timer $34_a$. The second AND gate 36 puts out the second main switch control signal $V_{g2}$, FIG. 15(I), as the logical produce of the output voltage $V_{33}$, FIG. 15(E), of the comparator 33 and the output voltage $V_{34b}$, FIG. 15(G), of the second timer $34_b$. The ancillary switch control signal $V_{g3}$, FIG. 15(J), for both ancillary switches $Q_{3a}$ and $Q_{3b}$ is produced by the third timer 37 as in FIGS. 2 and 3.

Thus the modified switch control circuit $8_a$ drives the two main switches $Q_1$ and $Q_2$ at the same frequency but initiates conduction therethrough at different moments. This is apparent from (H) and (I) in FIG. 15 where the main switch control signals $V_{g1}$ and $V_{g2}$ are shown to rise at different moments. Conduction may indeed be initiated through the two main switches $Q_1$ and $Q_2$ at any desired moments relative to each other by the timers $34_a$ and $34_b$.

Embodiment of FIGS. 16–19

Figure 16:
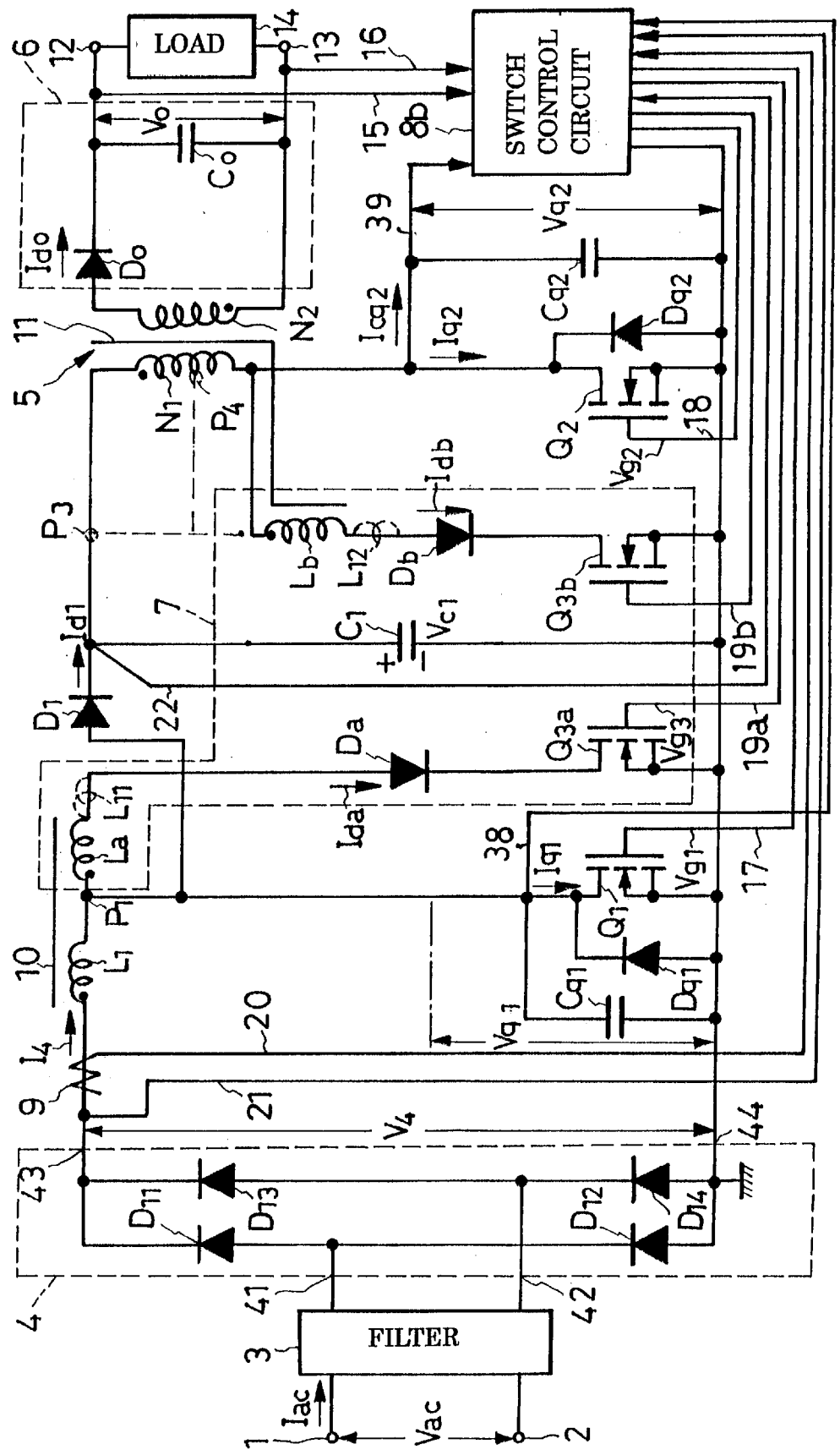
FIG. 16 is a view similar to FIG. 1 but showing a further preferred form of switching power supply according to the invention.

In the FIG. 16 embodiment is incorporated another modified switch control circuit $8_b$ which differs from its FIG. 1 counterpart in having two additional input conductors 38 and 39 connected thereto. The input conductor 38 is connected to the drain of the first main switch $Q_1$ for detection of the voltage across the same. The other input conductor 39 is connected to the drain of the second main switch $Q_2$ for detection of the voltage across the same.

Figure 17:
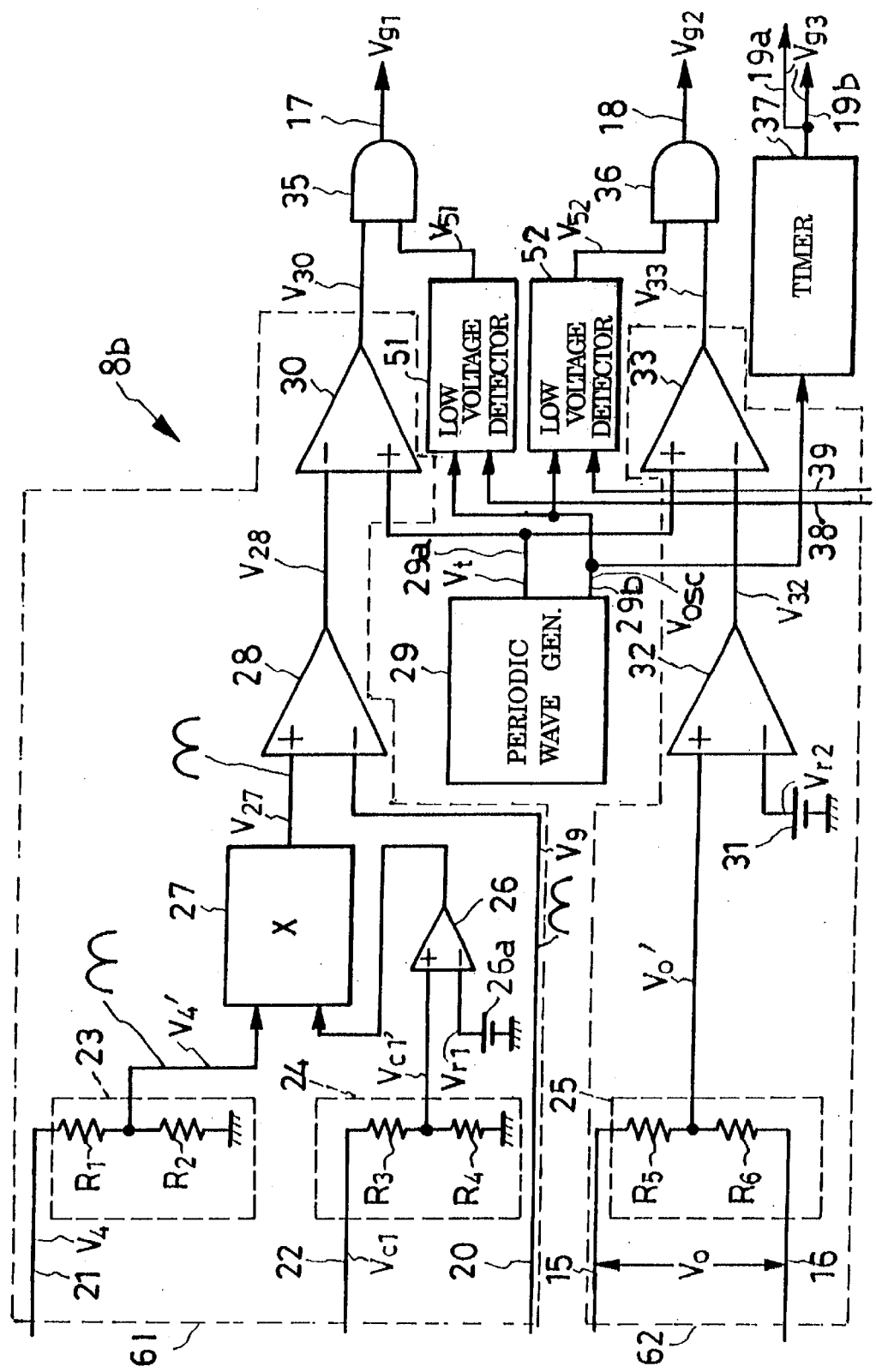
FIG. 17 is a view similar to FIG. 2 but showing another modified switch control circuit which is included in the FIG. 16 power supply.

As shown in detail in FIG. 17, the switch control circuit $8_b$ has two low-voltage detector circuits 51 and 52 in places of the timers $34_a$ and $34_b$ of the FIG. 14 switch control circuit $8_a$. The first low-voltage detector circuit 51 is connected by way of the additional input conductor 38 to the drain of the first main switch $Q_1$, FIG. 16, for ascertaining whether the drain-source voltage of the first main switch is less than a first reference voltage $V_a$ or not. The second low-voltage detector circuit 52 is connected by way of the other additional input conductor 39 to the drain of the second main switch $Q_2$ for determining whether drain-source voltage of the second main switch is less than a second reference voltage $V_b$ or not. Both low-voltage detector circuits 51 and 52 have additional inputs connected to the clock output $29_b$ of the period wave generator 29 in order to detect the drain-source voltages of the main switches $Q_1$ and $Q_2$ in synchronism with the sawtooth voltage $V_t$.

The low-voltage detector circuits 51 and 52 have their outputs connected to the AND gates 35 and 36, respectively. The output voltages $V_{51}$ and $V_{52}$ of the low-voltage detector circuits 51 and 52 function like the outputs $34_a$ and $34_b$ of the timers $34_a$ and $34_b$ of the FIG. 14 switch control circuit $8_a$, as will become more apparent as the description proceeds.

Figure 18:
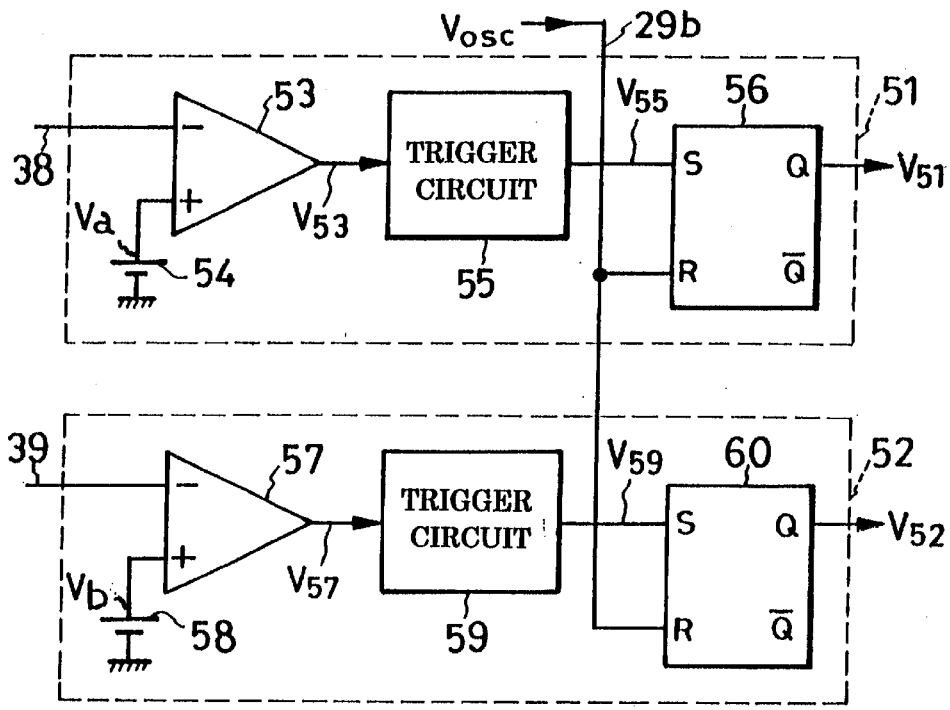
FIG. 18 is a schematic electrical diagram, partly in block form, showing in more detail the low-voltage detector circuits included in the FIG. 17 embodiment.

FIG. 18 is a detailed illustration of both low-voltage detector circuits 51 and 52. The following description of this figure will be better understood when taken together with FIG. 19, a diagram of voltage waveforms appearing in the FIG. 18 circuitry. The first low-voltage detector circuit 51 includes a comparator 53 having a negative input connected to the drain of the first main switch $Q_1$ via the input conductor 38, and a positive input connected to a reference voltage source 54. As indicated at (A) in FIG. 19, the first reference voltage $V_a$ from the source 54 is less than the maximum value, and somewhat more than the minimum value, of the drain-source voltage $V_{q1}$ of the first main switch $Q_1$. The output $V_{53}$ from the comparator 53 is therefore high, as at (C) in FIG. 19, when the voltage $V_{q1}$ across the first main switch $Q_1$ is less than the first reference voltage $V_a$, as from $t_2$ to $t_3$ in FIG. 19.

Figure 19:
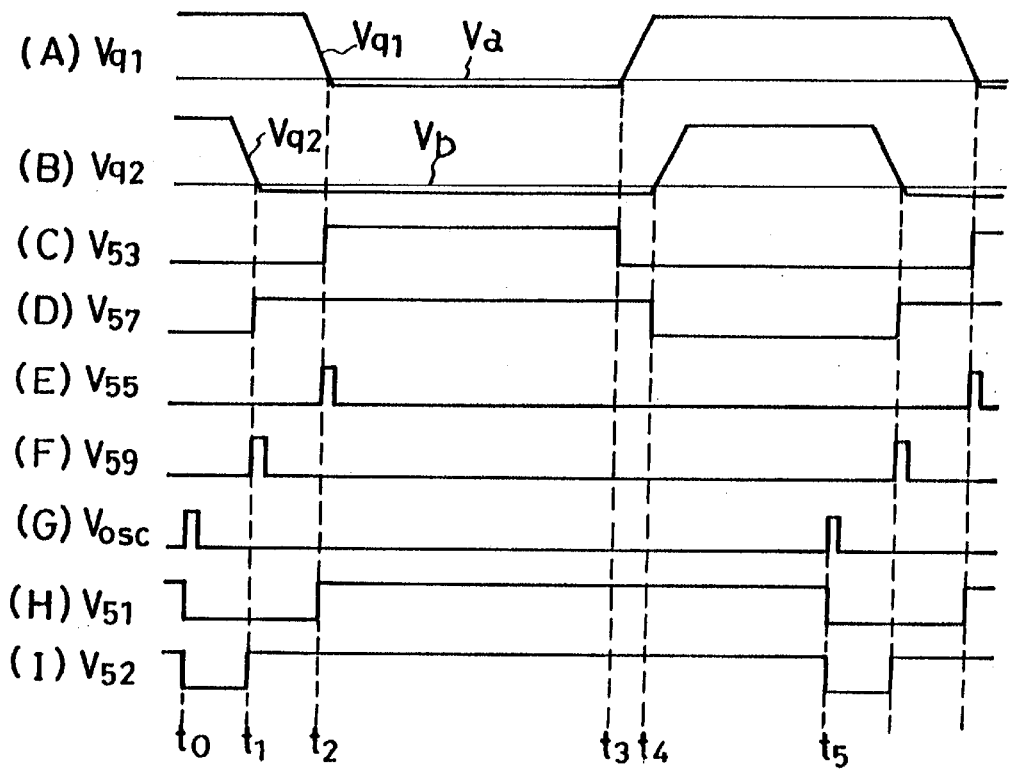
FIG. 19, consisting of (A) through (I), is a series of diagrams showing the voltage waveforms appearing at various parts of the FIG. 18 circuitry.

Connected to the output of the comparator 53, a trigger circuit 55 puts out a trigger pulse $V_{55}$, FIG. 19(E), when the comparator output $V_{53}$ goes high as at $t_2$. A flip-flop 56, the final-stage component of the first low-voltage detector circuit 51, has a set input S connected to the trigger circuit 55, a reset input R connected to the clock output $29_b$ of the periodic wave generator 29, and a noninverting output Q connected to the AND gate 35, FIG. 17. Reset as at $t_0$ in FIG. 19 by each clock pulse $V_{osc}$, FIG. 19(G), the flip-flop 56 will provide an output $V_{51}$, FIG. 19(H), which will be low until $t_2$ when it is set by the high output $V_{55}$ from the trigger circuit 55. This output $V_{51}$ is delivered as aforesaid to the AND gate 35, FIG. 17, together with the output $V_{30}$ from the first main switch control circuit 61.

The second low-voltage detector circuit 52 includes a comparator 57 having a negative input connected to the drain of the second main switch $Q_2$ via the input conductor 39, and a positive input connected to a reference voltage source 58. As indicated at (B) in FIG. 19, the first reference voltage $V_b$ from its source 58 is less than the maximum value, and somewhat more than the minimum value, of the drain-source voltage $V_{q2}$ of the second main switch $Q_2$. The output $V_{57}$ from the comparator 57 is therefore high, as at (D) in FIG. 19, when the voltage $V_{q2}$ across the second main switch $Q_2$ is less than the second reference voltage $V_b$, as from $t_1$ to $t_4$ in FIG. 19.

Connected to the output of the comparator 57, a trigger circuit 59 puts out a trigger pulse $V_{59}$, FIG. 19(F), when the comparator output $V_{57}$ goes high as at $t_1$. A flip-flop 60, the final-stage component of the second low-voltage detector circuit 52, has a set input S connected to the trigger circuit 59, a reset input R connected to the clock output $29_b$ of the periodic wave generator 29, and a noninverting output Q connected to the AND gate 36, FIG. 17. Reset as at to in FIG. 19 by each clock pulse $V_{osc}$, FIG. 19(G), the flip-flop 60 will provide an output $V_{52}$, FIG. 19(I), which will be low until $t_1$ when it is set by the high output $V_{59}$ from the trigger circuit 59. This output $V_{52}$ is delivered to the AND gate 36, FIG. 17, together with the output $V_{33}$ from the second main switch control circuit 62.

Although the reference voltages $V_a$ and $V_b$ are shown higher than zero at (A) and (B) in FIG. 19, these reference voltages could be zero in cases where noise production is no problem. Further the reference voltages $V_a$ and $V_b$ could be either the same or different.

The moment $t_2$ when the output $V_{51}$ from the first low-voltage detector circuit 51 goes high, as at (H) in FIG. 19, represents the moment when the low- or zero-voltage switching of the first main switch $Q_1$ becomes possible. Similarly, the moment $t_1$ when the output $V_{52}$ from the second low-voltage detector circuit 52 goes high, as at (I) in FIG. 19, represents the moment when the low- or zero-voltage switching of the second main switch $Q_2$ becomes possible. Thus the low-voltage detector circuits 51 and 52 of the FIG. 17 switch control circuit $8_b$ perform the same functions as the timers $34_a$ and $34_b$ of the FIG. 14 switch control circuit $8_a$, conducing to the soft-switching of the two main switches $Q_1$ and $Q_2$.

The main switches $Q_1$ and $Q_2$ of this FIG. 16 embodiment are turned on when their voltages $V_{q1}$ and $V_{q2}$ drop below the reference voltages $V_a$ and $V_b$, respectively, as a result of soft switching. More stable soft-switching of the main switches $Q_1$ and $Q_2$ is therefore possible by this switch control circuit $8_b$ than by its FIG. 2 counterpart 8 or FIG. 14 counterpart $8_a$. For, in use of the timer 34 of the FIG. 2 switch control circuit 8, or of the timers $34_a$ and $34_b$ of the FIG. 14 circuit $8_a$, the main switches $Q_1$ and $Q_2$ will be almost unavoidably subject to fluctuations in the moments when they are turned on, because of errors in the durations of the output pulses of those timers. This switch control circuit $8_b$ lends itself to use not only in the FIG. 1 embodiment but in those of FIGS. 6, 8–11, 13 and 14 as well.

Possible Modifications

Notwithstanding the foregoing detailed disclosure it is not desired that the present invention be limited by the exact showing of the drawings or the description thereof. The following is a brief list of possible modifications of the illustrated embodiments:

1. The main switches $Q_1$ and $Q_2$ could be made bidirectional, in which case the parallel diodes $D_{q1}$ and $D_{q2}$ would be unnecessary.
2. The periodic wave generator 29 is so named because a triangular wave could be employed in lieu of a sawtooth wave.
3. The AND gates 35 and 36 of the switch control circuits 8, $8_a$ and $8_b$ could be replaced by other essentially equivalent logic circuits.
4. The current detector circuit 9 could be connected on the input side of the rectifier circuit 4.
5. The voltage detecting conductor 21 could also be connected on the input side of the rectifier circuit 4 via an other rectifier circuit.
6. The reverse-blocking diodes $D_a$ and $D_b$ could be omitted if the ancillary switches $Q_{3a}$ and $Q_{3b}$ are themselves equipped for prevention of reverse current flow.
7. An insulated-gate bipolar transistor or any other suitable semiconductor switches could be used in place of the FET switches $Q_1$, $Q_2$, $Q_{3a}$ and $Q_{3b}$.

What is claimed is:

1. A switching power supply capable of translating a.c. voltage of sinusoidal waveform into d.c. voltage, comprising:

(a) a pair of a.c. input terminals for inputting a.c. voltage having a known frequency;
(b) a rectifier circuit connected to the pair of input terminals for rectifying the input a.c. voltage, the rectifier circuit having a first and a second output for providing a rectifier output voltage;
(c) a main inductor connected to the first output of the rectifier circuit;
(d) a main switch connected to the first output of the rectifier circuit via the main inductor on one hand and, on the other hand, to the second output of the rectifier circuit;
(e) soft-switching capacitance means associated with the first main switch;
(f) a rectifying diode;
(g) a smoothing capacitor connected in parallel with the main switch via the rectifying diode;
(h) an ancillary inductor connected to the main inductor and electromagnetically coupled thereto;
(i) an ancillary switch connected to the main inductor via the ancillary inductor on one hand and, on the other hand, to the second output of the rectifier circuit;
a first reverse-blocking diode connected in series with the ancillary inductor; and
(k) a switch control circuit connected to the main switch for on-off control thereof at a repetition frequency higher than the frequency of the input a.c. voltage, and to the ancillary switch for on-off control thereof at such a repetition frequency, and with such conducting periods, as to assure soft turn-on of the main switch.

2. The switching power supply of claim 1 wherein the switch control circuit comprises:

(a) first voltage detector means for detecting an input voltage or an output voltage of the rectifier circuit;
(b) second voltage detector means for detecting a voltage across the smoothing capacitor;
(c) current detector means for detecting a current through the rectifier circuit;
(d) a periodic wave generator for generating a periodic voltage wave with a frequency higher than the frequency of the input a.c. voltage;
(e) tentative conducting period determination means connected to the first and the second voltage detector means and the current detector means and the periodic wave generator for determining tentative conducting periods for the main switch in order to hold the voltage across the smoothing capacitor at a desired value and to cause the input current of the rectifier circuit to approximate a sinusoidal waveform;
(f) a timer connected to the periodic wave generator for determining conducting periods for the ancillary switch in synchronism with the periodic wave;
(g) conducting period limitation means for providing a conducting period limitation signal that is in a prescribed state for a prescribed period of time from the beginning of each conducting period of the ancillary switch; and
(h) a logic circuit having inputs connected to the tentative conducting period determination means and the conducting period limitation means for nullifying the tentative conductive periods as long as the conducting period limitation signal is in the prescribed state.

3. The switching power supply of claim 2 wherein the conducting period limitation means comprises a timer connected to the periodic wave generator for providing the conducting period limitation signal in synchronism with the periodic wave.

4. The switching power supply of claim 1 wherein the switch control circuit comprises:
(a) first voltage detector means for detecting an input voltage or an output voltage of the rectifier circuit;
(b) second voltage detector means for detecting a voltage across the smoothing capacitor;
(c) current detector means for detecting a current through the rectifier circuit;
(d) a periodic wave generator for generating a periodic voltage wave with a frequency higher than the frequency of the input a.c. voltage;
(e) tentative conducting period determination means connected to the first and the second voltage detector means and the current detector means and the periodic wave generator for determining tentative conducting periods for the main switch in order to hold the voltage across the smoothing capacitor at a desired value and to cause the input current of the rectifier circuit to approximate a sinusoidal waveform;
(f) a timer connected to the periodic wave generator for determining conducting periods for the ancillary switch in synchronism with the periodic wave;
(g) third voltage detector means for detecting a voltage across the main switch;
(h) a source of a reference voltage;
(i) a comparator connected to both the third voltage detector means and the reference voltage source to determine whether the voltage across the main switch is less than the reference voltage;
(j) conducting period limitation means connected to the comparator for providing a conducting period limitation signal that is in a prescribed state from the beginning of each conducting period of the ancillary switch to the moment the voltage across the main switch becomes less than the reference voltage; and
(k) a logic circuit connected to the tentative conducting period determination means and the conducting period limitation means for nullifying the tentative conductive periods as long as the conducting period limitation signal is in the prescribed state.

5. A switching power supply capable of translating a.c. voltage of sinusoidal waveform into d.c. voltage, comprising:
(a) a pair of a.c. input terminals for inputting a.c. voltage having a known frequency;
(b) a rectifier circuit connected to the pair of input terminals for rectifying the input a.c. voltage, the rectifier circuit having a first and a second output for providing a rectifier output voltage;
(c) a main inductor connected to the first output of the rectifier circuit;
(d) a first main switch connected to the first output of the rectifier circuit via the main inductor on one hand and, on the other hand, to the second output of the rectifier circuit;
(e) first soft-switching capacitance means associated with the first main switch;
(f) a rectifying diode;
(g) a smoothing capacitor connected in parallel with the main switch via the rectifying diode, the smoothing capacitor having a first terminal and a second terminal;
(h) a transformer;
(i) a second main switch connected to the first terminal of the smoothing capacitor via a primary winding of the transformer on one hand and, on the other hand, to the second terminal of the smoothing capacitor;
(j) second soft-switching capacitance means associated with the second main switch;
(k) a rectifying and smoothing circuit connected to the transformer for providing output d.c. voltage;
(l) a first ancillary inductor connected to the main inductor and electromagnetically coupled thereto;
(m) a first ancillary switch connected to the main inductor via the first ancillary inductor on one hand and, on the other hand, to the second output of the rectifier circuit;
(n) a second ancillary inductor electromagnetically coupled to the primary winding of the transformer and having one extremity connected to a junction between the second main switch and the smoothing capacitor;
(o) a second ancillary switch connected to another extremity of the second ancillary inductor on one hand and, on the other hand, to the second output of the rectifier circuit; and
(p) a switch control circuit connected to the first main switch for on-off control thereof at a repetition frequency higher than the frequency of the input a.c. voltage, to the second main switch for on-off control thereof in order to cause d.c. voltage to be intermittently applied from the smoothing capacitor to the primary winding of the transformer, and to the first and the second ancillary switch for on-off control thereof at such a repetition frequency, and with such conducting periods, as to assure soft turn-on of the first and the second main switch.

6. The switching power supply of claim 5 wherein the switch control circuit is adapted to drive the first and the second main switch at the same repetition frequency.

7. The switching power supply of claim 6 wherein the switch control circuit is adapted to turn the first and the second main switch at the same moment.

8. The switching power supply of claim 5 wherein the switch control circuit comprises:
(a) first voltage detector means for detecting an input voltage or an output voltage of the rectifier circuit;
(b) second voltage detector means for detecting a voltage across the smoothing capacitor;
(c) third voltage detector means for detecting the output voltage of the rectifying and smoothing circuit;
(d) current detector means for detecting a current through the rectifier circuit;
(e) a periodic wave generator for generating a periodic voltage wave with a frequency higher than the frequency of the input a.c. voltage;
(f) first tentative conducting period determination means connected to the first and the second voltage detector means and the current detector means and the periodic wave generator for determining tentative conducting periods for the first main switch in order to hold the voltage across the smoothing capacitor at a desired value and to cause the input current of the rectifier circuit to approximate a sinusoidal waveform;
(g) second tentative conducting period determination means connected to the third voltage detector means and the periodic wave generator for determining tentative conducting periods for the second main switch in order to hold the output voltage of the rectifying and smoothing circuit at a desired value;
(h) a timer connected to the periodic wave generator for determining conducting periods for the first and the second ancillary switch in synchronism with the periodic wave;

(i) conducting period limitation means for providing a conducting period limitation signal that is in a prescribed state for a prescribed period of time from the beginning of each conducting period of the first and the second ancillary switch;

(j) a first logic circuit having inputs connected to the first tentative conducting period determination means and the conducting period limitation means for nullifying the tentative conductive periods for the first main switch as long as the conducting period limitation signal is in the prescribed state; and (k) a second logic circuit having inputs connected to the second tentative conducting period determination means and the conducting period limitation means for nullifying the tentative conductive periods for the second main switch as long as the conducting period limitation signal is in the prescribed state.

9. The switching power supply of claim 8 wherein the conducting period limitation means comprises a timer connected to the periodic wave generator for providing the conducting period limitation signal in synchronism with the periodic wave.

10. The switching power supply of claim 5 wherein the switch control circuit comprises:

(a) first voltage detector means for detecting an input voltage or an output voltage of the rectifier circuit;

(b) second voltage detector means for detecting a voltage across the smoothing capacitor;

(c) third voltage detector means for detecting the output voltage of the rectifying and smoothing circuit;

(d) current detector means for detecting a current through the rectifier circuit;

(e) a periodic wave generator for generating a periodic voltage wave with a frequency higher than the frequency of the input a.c. voltage;

(f) first tentative conducting period determination means connected to the first and the second voltage detector means and the current detector means and the periodic wave generator for determining tentative conducting periods for the first main switch in order to hold the voltage across the smoothing capacitor at a desired value and to cause the input current of the rectifier circuit to approximate a sinusoidal waveform;

(g) second tentative conducting period determination means connected to the third voltage detector means and the periodic wave generator for determining tentative conducting periods for the second main switch in order to hold the output voltage of the rectifying and smoothing circuit at a desired value;

(h) a timer connected to the periodic wave generator for determining conducting periods for the first and the second ancillary switch in synchronism with the periodic wave;

(i) first conducting period limitation means for providing a first conducting period limitation signal that is in a prescribed state for a first prescribed period of time from the beginning of each conducting period of the first and the second ancillary switch;

(j) second conducting period limitation means for providing a second conducting period limitation signal that is in a prescribed state for a second prescribed period of time from the beginning of each conducting period of the first and the second ancillary switch;

(k) a first logic circuit having inputs connected to the first tentative conducting period determination means and the first conducting period limitation means for nullifying the tentative conductive periods for the first main switch as long as the first conducting period limitation signal is in the prescribed state; and (l) a second logic circuit having inputs connected to the second tentative conducting period determination means and the second conducting period limitation means for nullifying the tentative conductive periods for the second main switch as long as the second conducting period limitation signal is in the prescribed state.

11. The switching power supply of claim 10 wherein the first conducting period limitation means comprises a timer connected to the periodic wave generator for providing the first conducting period limitation signal in synchronism with the periodic wave, and wherein the second conducting period limitation means comprises another timer connected to the periodic wave generator for providing the second conducting period limitation signal in synchronism with the period wave.

12. The switching power supply of claim 5 wherein the switch control circuit comprises:

(a) first voltage detector means for detecting an input voltage or an output voltage of the rectifier circuit;

(b) second voltage detector means for detecting a voltage across the smoothing capacitor;

(c) third voltage detector means for detecting the output voltage of the rectifying and smoothing circuit;

(d) current detector means for detecting a current through the rectifier circuit;

(e) a periodic wave generator for generating a periodic voltage wave with a frequency higher than the frequency of the input a.c. voltage;

(f) first tentative conducting period determination means connected to the first and the second voltage detector means and the current detector means and the periodic wave generator for determining tentative conducting periods for the first main switch in order to hold the voltage across the smoothing capacitor at a desired value and to cause the input current of the rectifier circuit to approximate a sinusoidal waveform;

(g) second tentative conducting period determination means connected to the third voltage detector means and the periodic wave generator for determining tentative conducting periods for the second main switch in order to hold the output voltage of the rectifying and smoothing circuit at a desired value;

(h) a timer connected to the periodic wave generator for determining conducting periods for the first and the second ancillary switch in synchronism with the periodic wave;

(i) first main switch voltage detector means for detecting voltage across the first main switch;

(j) second main switch voltage detector means for detecting voltage across the second main switch;

(k) means for providing a first and a second reference voltage;

(l) a first comparator connected to the first main switch voltage detector means and to the providing means for comparing the voltage across the first main switch with the first reference voltage;

(m) a second comparator connected to the second main switch voltage detector means and to the providing means for comparing the voltage across the second main switch with the second reference voltage;

(n) first conducting period limitation means connected to the first comparator for providing a first conducting period limitation signal that is in a prescribed state from the beginning of each conducting period of the first and the second ancillary switch to the moment when the voltage across the first main switch becomes less than the first reference voltage;

(o) second conducting period limitation means connected to the second comparator for providing a second conducting period limitation signal that is in a prescribed state from the beginning of each conducting period of the first and the second ancillary switch to the moment when the voltage across the second main switch becomes less than the second reference voltage;

(p) a first logic circuit having inputs connected to the first tentative conducting period determination means and the first conducting period limitation means for nullifying the tentative conductive periods for the first main switch as long as the first conducting period limitation signal is in the prescribed state; and (q) a second logic circuit having inputs connected to the second tentative conducting period determination means and the second conducting period limitation means for nullifying the tentative conductive periods for the second main switch as long as the second conducting period limitation signal is in the prescribed state.

13. The switching power supply of claim 5 wherein the transformer has a secondary winding, and wherein the rectifying and smoothing circuit is connected to the secondary winding of the transformer.

14. The switching power supply of claim 13 wherein the rectifying and smoothing circuit comprises:

(a) a rectifying diode connected to one extremity of the secondary winding of the transformer, the rectifying diode being so oriented as to become conductive in response to a voltage developing across the transformer secondary during the nonconducting periods of the second main switch; and (b) a smoothing capacitor connected in parallel with the transformer secondary via the rectifying diode.

15. The switching power supply of claim 13 wherein the rectifying and smoothing circuit comprises:

(a) a rectifying diode connected to one extremity of the secondary winding of the transformer, the rectifying diode being so oriented as to become conductive in response to a voltage developing across the transformer secondary during the conducting periods of the second main switch; and (b) a smoothing circuit connected in parallel with the transformer secondary via the rectifying diode.

* * * * *

UNITED STATES PATENT AND TRADEMARK OFFICE
CERTIFICATE OF CORRECTION

PATENT NO.    : 6,700,801 B2
DATED         : March 2, 2004
INVENTOR(S)   : Koichi Morita and Toshiyuki Yamagishi It is certified that error appears in the above-identified patent and that said Letters Patent is hereby corrected as shown below:

Column 3,
Line 61, delete "combinations" and insert -- combination -- therefor;

Column 5,
Line 5, delete "pre-preferred" and insert -- preferred -- therefor;

Column 20,
Line 17, delete "FIG. 41" and insert -- FIG. 11 -- therefor;

Column 21,
Line 39, delete "moments" and insert -- moment -- therefor;

Column 24,
Line 21, insert -- (j) -- before the phrase "a first reverse-blocking diode".

Signed and Sealed this

Ninth Day of November, 2004

JON W. DUDAS
*Director of the United States Patent and Trademark Office*